(12) United States Patent
Yoshida et al.

(10) Patent No.: US 9,505,431 B2
(45) Date of Patent: Nov. 29, 2016

(54) ROTATION DETECTION DEVICE AND POWER STEERING DEVICE

(71) Applicant: HITACHI AUTOMOTIVE SYSTEMS STEERING, LTD., Hiki-gun, Saitama (JP)

(72) Inventors: Osamu Yoshida, Yokohama (JP); Tatsuyoshi Maruyama, Atsugi (JP); Kiyotaka Shirakubo, Ayase (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 0 days.

(21) Appl. No.: 14/651,834

(22) PCT Filed: Jan. 27, 2014

(86) PCT No.: PCT/JP2014/051639
§ 371 (c)(1),
(2) Date: Jun. 12, 2015

(87) PCT Pub. No.: WO2014/148106
PCT Pub. Date: Sep. 25, 2014

(65) Prior Publication Data
US 2016/0016607 A1    Jan. 21, 2016

(30) Foreign Application Priority Data
Mar. 22, 2013 (JP) ................. 2013-060844

(51) Int. Cl.
*G01L 3/00* (2006.01)
*G01L 3/10* (2006.01)
(Continued)

(52) U.S. Cl.
CPC . *B62D 6/10* (2013.01); *B62D 5/04* (2013.01); *B62D 5/0421* (2013.01); *G01D 5/142* (2013.01); *G01L 3/10* (2013.01); *G01L 3/104* (2013.01); *G01L 5/221* (2013.01)

(58) Field of Classification Search
CPC ......... B62D 6/10; B62D 5/0421; G01L 3/10; G01L 3/104
USPC ............................ 73/863.325, 847; 180/444
See application file for complete search history.

(56) References Cited

U.S. PATENT DOCUMENTS 8,375,810 B2    2/2013  Bae et al.
8,561,481 B2   10/2013  Bae et al.
(Continued)

FOREIGN PATENT DOCUMENTS

JP    09-056141 A    2/1997
JP    2004-093183 A   3/2004
(Continued)

*Primary Examiner* — Tony Winner
(74) *Attorney, Agent, or Firm* — Foley & Lardner LLP

(57) ABSTRACT

A rotation detecting device includes first and second members that are rotatable relative to each other around a rotation axis, a magnetic member fixed to the first member and having poles alternately arranged around the rotation axis, a detecting member arranged to face the magnetic member and made of a magnetic material, and a holding member fixed to the second member. The holding member is made of thermoplastic resin and includes first and second holding members that are welded and fixed to each other. The detecting member is disposed between the first and second holding members to prevent relative contact between the detecting member and the second member. The rotation detecting device further includes a magnetic sensor that detects relative rotation between the first and second members by sensing a change of magnetic field in the detecting member due to the relative rotation.

20 Claims, 12 Drawing Sheets

(51) Int. Cl.
  *B62D 6/10* (2006.01)
  *G01L 5/22* (2006.01)
  *B62D 5/04* (2006.01)
  *G01D 5/14* (2006.01)

(56) References Cited

U.S. PATENT DOCUMENTS

| | | |
|---|---|---|
| 8,955,396 B2 | 2/2015 | Bae et al. |
| 2004/0011138 A1* | 1/2004 | Gandel .................. G01L 3/104 73/847 |
| 2004/0194560 A1* | 10/2004 | Froehlich ............... G01L 3/104 73/862.333 |
| 2010/0319466 A1* | 12/2010 | Bae ........................ G01L 3/10 73/862.325 |
| 2011/0000319 A1* | 1/2011 | Maehara ................ G01L 5/221 73/862.193 |
| 2011/0167928 A1* | 7/2011 | Maehara ................. B62D 6/10 73/862.325 |
| 2012/0312088 A1* | 12/2012 | Kang ...................... B62D 6/10 73/117.02 |
| 2013/0125668 A1 | 5/2013 | Bae et al. |
| 2014/0013863 A1 | 1/2014 | Bae et al. |
| 2014/0283623 A1* | 9/2014 | Song ....................... B62D 6/10 73/862.193 |
| 2015/0307126 A1* | 10/2015 | Yoshida .................. B62D 6/10 180/446 |
| 2016/0083008 A1* | 3/2016 | Murakami ........... B62D 5/0421 180/443 |

FOREIGN PATENT DOCUMENTS

| | | |
|---|---|---|
| JP | 2008-180518 A | 8/2008 |
| JP | 2009-271055 A | 11/2009 |
| JP | 2010-539472 A | 12/2010 |

* cited by examiner (a)

(b)

ROTATION DETECTION DEVICE AND POWER STEERING DEVICE

TECHNICAL FIELD

The present invention relates to a rotation detecting device and a power steering device.

BACKGROUND ART

A hitherto-used rotation detecting device comprises a permanent magnet and a pair of yokes that are rotatable relative to each other, a pair of magnetism collecting rings that induce magnetic fluxes produced between the paired yokes due to the relative rotation between the permanent magnet and the paired yokes, and a Hall IC sensor that detects the magnetic fluxes between the magnetism collecting rings. The paired yokes and the paired magnetism collecting rings that constitute a detecting member are constructed of a soft magnetic material such as Permalloy (permeability alloy) or the like and integrally molded with a resin holder through an insert molding technique, and the yokes and magnetism collecting rings are connected to input/output shafts or a housing through the holder. One example of the above-mentioned technology is described in Patent Document 1.

PRIOR ART DOCUMENTS

Patent Documents

Patent Document 1: Japanese Laid-open Patent Application (tokkai) 2008-180518

SUMMARY OF INVENTION

Task to be Established by Invention

However, in the above-mentioned hitherto-used technology, due to cooling contracture induced by the insert molding, internal stress is inevitably produced in the detecting member thereby deforming the detecting member, so that due to a magnetic loss, a magnetic hysteresis of the Permalloy is increased and thus the detection precision is lowered.

An object of the present invention is to provide both a rotation detecting device and a power steering device that can restrain the deformation of the detecting member and increase the detection precision.

Means for Establishing Task

In a rotation detecting device of the present invention, a first holding member and a second holding member are welded and fixed to each other with a detecting member sandwiched between the first holding member and the second holding member.

Effect of Invention

Accordingly, in the invention, the deformation of the detecting member can be restrained and thus the detection precision can be increased.

EMBODIMENT FOR CARRYING OUT INVENTION

Figure 1:
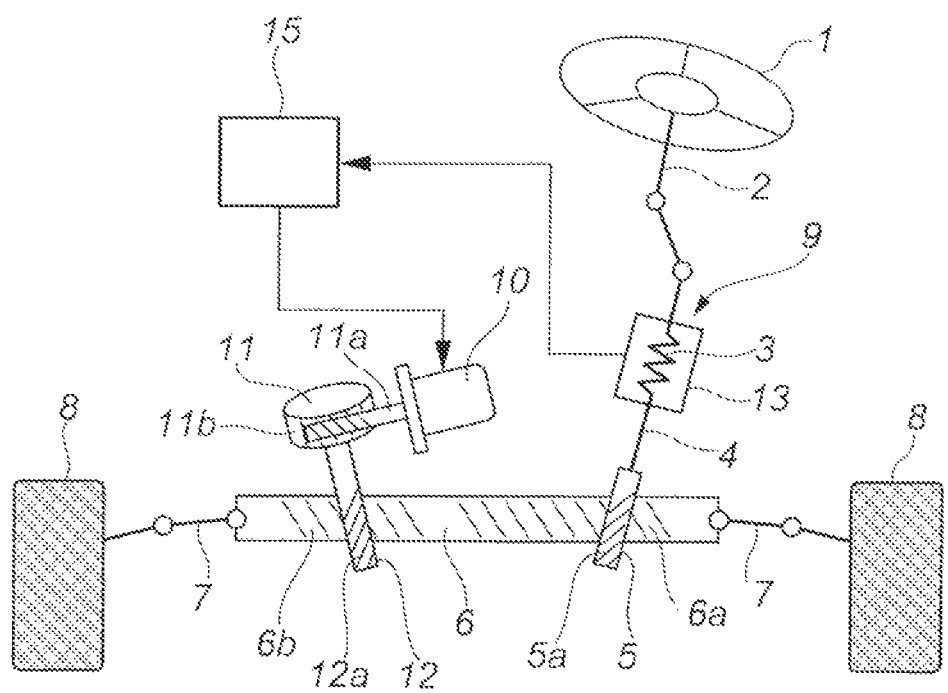
FIG. 1 is an entire constructional view of an electric power steering device that is a first embodiment.

In the following, a rotation detecting device and a power steering device that are provided by the present invention will be described with reference to an embodiment shown in the drawings.

First Embodiment

First, the construction will be described.
[Electric Power Steering Device]
FIG. 1 is an entire constructional view of an electric power steering device of a first embodiment.

A steering force applied to a steering wheel 1 by a driver is transmitted as a rotary motion to a first pinion 5 through a steering shaft (second member, input shaft) 2, a torsion bar 3 and a pinion shaft (first member, output shaft) 4 and transformed into a linear motion by a rack bar 6 that has first rack teeth 6a meshed with pinion teeth 5a of the first pinion 5. The linear motion of the rack bar 6 is transmitted to steered road wheels 8 and 8 through tie-rods 7 and 7. The steering shaft 2, the torsion bar 3, the pinion shaft 4, the first pinion 5, the rack bar 6 and the tie-rods 7 and 7 constitute a steering mechanism 9 through which the steering operation of the steering wheel 1 is transmitted to the steered road wheels 8.

While, an output of an electric motor 10 is transmitted to a second pinion 12 through a speed reduction device 11, which includes a worm shaft 11a and a worm wheel 11b, and the output of the electric motor is transformed into a linear motion of the rack bar 6 through second rack teeth 6b meshed with pinion teeth 12a of the second pinion 12. The second pinion 12 is integrally formed with the worm wheel 11b. The electric motor 10 is for example a three-phase brushless motor and functions to apply a steering assist force to the steering mechanism 9 in accordance with an instruction signal issued from a motor control circuit 15.

To the steering shaft 2, there is connected a torque sensor (rotation detecting device) 13 for detecting a relative rotation between the steering shaft 2 and the pinion shaft 4.

Based on a steering torque produced between the steering shaft 2 and the pinion shaft 4, which is derived from an output signal from the torque sensor 13, and a running condition of the vehicle such as a vehicle speed and the like, the motor control circuit 15 calculates an instruction signal for the electric motor 10 and outputs the instruction signal to the electric motor 10.

Figure 2:
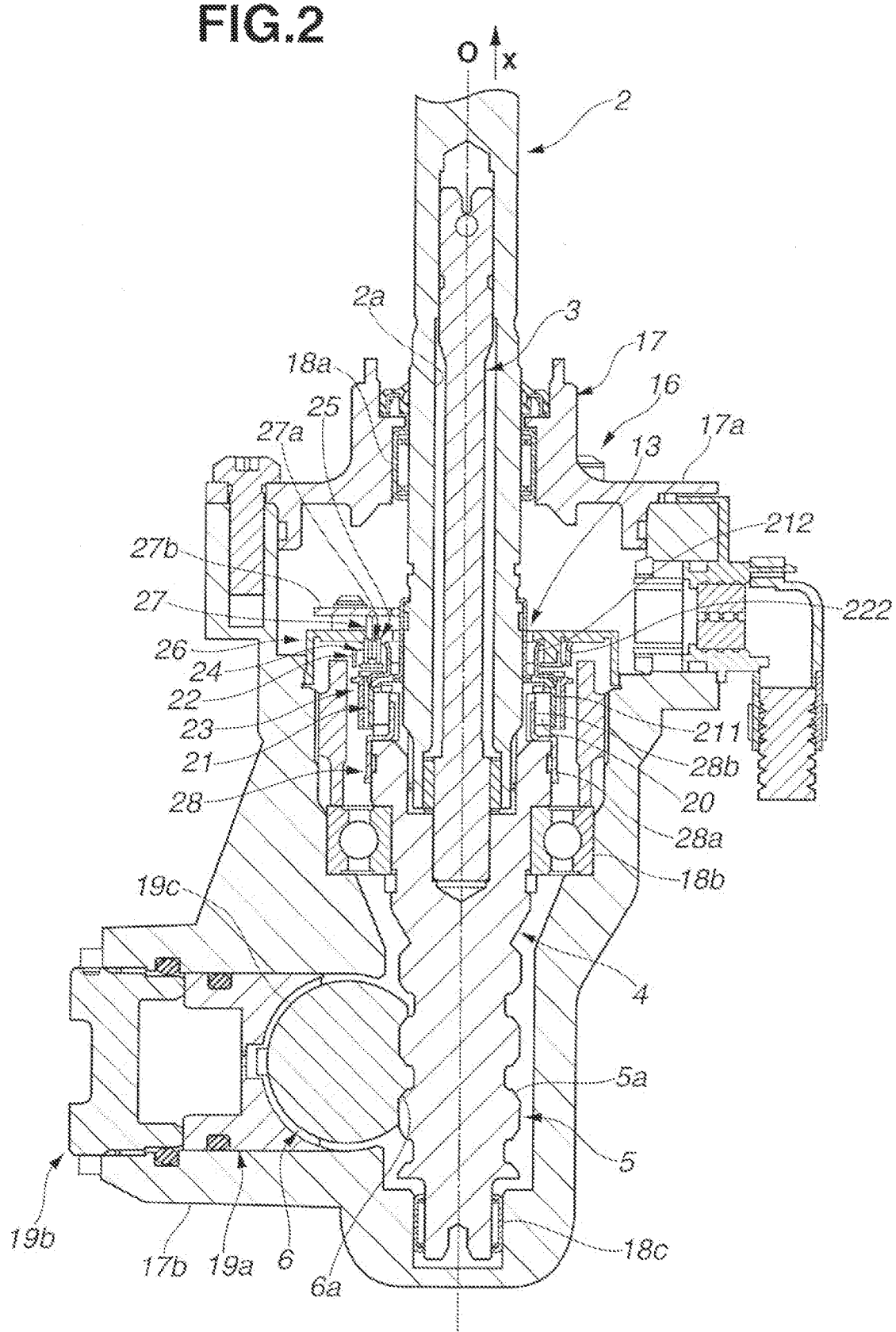
FIG. 2 is a vertically sectioned view of a steering gear box 16 employed in the first embodiment.

FIG. 2 is a vertically sectioned view of a steering gear box 16 employed in the first embodiment.

The steering gear box 16 is equipped with a gear box housing (housing) 17. The steering shaft 2 and the pinion shaft 4 are arranged to rotate around a common rotation axis O relative to the gear box housing 17. In the following explanation, an x-axis will be referred to as an imaginary axis that extends in the direction of the rotation axis O, and a direction in which the steering shaft 2 extends relative to the pinion shaft 4 will be referred to as a positive direction. The gear box housing 17 comprises a shaft container portion 17a that is so arranged as to match its longitudinal direction with the direction of the rotation axis, a guide container portion 17b that projects from the shaft container portion 17a toward a rear part of the vehicle and a rack container portion (not shown) that is arranged perpendicular to the shaft container portion 17a and so arranged as to match its longitudinal direction with a vehicle width direction. The shaft container portion 17a, the guide container portion 17b and the rack container portion are all cylindrical in shape.

Within the shaft container portion 17a, there are received parts of the steering shaft 2 and the torsion bar 3, the pinion shaft 4 and the torque sensor 13. The torsion bar 3 is unrotatably or tightly inserted in a hollow 2a formed in one end portion of the steering shaft 2 that extends in an x-axis negative direction (viz., in a negative direction along the x-axis). One end portion of the torsion bar 3 that extends in an x-axis negative direction is connected to the pinion shaft 4 through a spline fitting. The steering shaft 2 is rotatably supported by the gear box housing 17 through a bearing 18a. Both end portions of the pinion shaft 4 that extend in x-axis positive and negative directions are rotatably supported by the gear box housing 17 through bearings 18b and 18c.

Within the rack container portion, there is received the rack bar 6.

Within the guide container portion 17b, there is received a generally cylindrical rack guide 19a that is axially movable along the guide container portion 17b. To an open end portion of the guide container portion 17b, there is screwed a cap 19b. To a rack bar side of the rack guide 19a, there is fixed a seat 19c for suppressing abrasion of the rack guide 19a.

[Torque Sensor]

The torque sensor 13 comprises a multipolar magnet (magnetic member) 20, a pair of yokes (detecting members) 21 and 22, a yoke holder (second holding member) 23, a pair of magnetism collecting rings (detecting members) 24 and 25, a magnetism collecting ring holder 26 and a Hall IC sensor (magnetic sensor) 27. The multipolar magnet 20, the paired yokes 21 and 22, the yoke holder 23, the paired magnetism collecting rings 24 and 25 and the magnetism collecting ring holder 26 are all arranged concentric with the rotation axis O.

The multipolar magnet 20 is an annular permanent magnet unit that has sixteen poles (viz., eight N-poles and eight S-poles) alternately arranged around the rotation axis at evenly spaced intervals. The multipolar magnet 20 is fixed to the pinion shaft 4 through a magnet holder 28. The magnet holder 28 is cylindrical in shape and comprises a larger diameter portion 28a and a smaller diameter portion 28b. The larger diameter portion 28a is fixed to an outer cylindrical portion of an x-axis positive direction end portion of the pinion shaft 4. The smaller diameter portion 28b is placed at an x-axis positive direction side of the larger diameter portion 28a and connected to a cylindrical inner surface of the multipole magnet 20.

Figure 5:
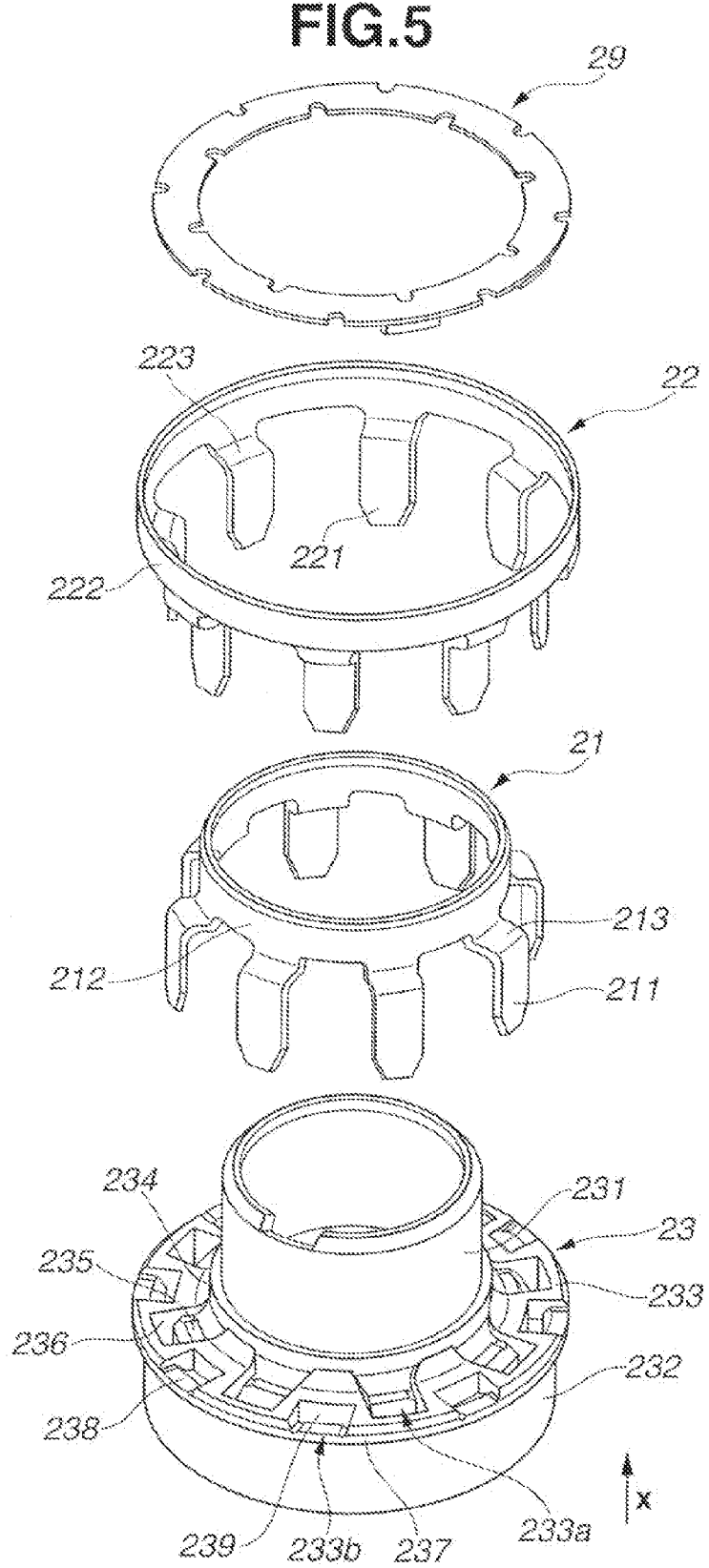
FIG. 5 is an exploded perspective view of the yoke assembly employed in the first embodiment.

The paired yokes 21 and 22 are constructed of Permalloy (soft magnetic alloy), and as is seen from FIG. 5, each yoke has eight pawl portions 211 or 221 and an annular portion 212 or 222. The pawl portions 211 or 221 are alternately arranged around a common circle at a given interval while surrounding an outer periphery of the annular multipolar magnet 20, and the pawl portions are arranged to face the multipolar magnet 20 keeping a given radial distance therebetween. The annular portions 212 and 222 are provided at x-axis positive direction sides of the pawl portions 211 and 221 and, the annular portions 212 and 222 are arranged to face each other having a given radial distance kept therebetween. The paired yokes 21 and 22 are so arranged that under a neutral steering condition wherein no torque is applied to both the steering shaft 12 and the pinion shaft 4, leading ends of the pawl portions 211 and 221 point at respective boundaries each being defined between adjacent N-pole and S-pole of the multipolar magnet 20.

The yoke holder 23 is molded from a thermoplastic resin and shaped like a center projected annular member, and the yoke holder 23 holds the paired yokes 21 and 22. The yoke holder 23 is fixed to the steering shaft 2.

The paired magnetism collecting rings 24 and 25 are each constructed of Permalloy and shaped like character C. These paired rings 24 and 25 have predetermined radial air gaps respectively and are arranged in a middle position of an annular space defined between the annular portions 212 and 222 of the yokes 21 and 22 while being in noncontact with the yokes 21 and 22.

The magnetism collecting ring holder 26 is molded from a thermoplastic resin and shaped cylindrical, and the holder 26 holds the paired magnetism collecting rings 24 and 25. The magnetism collecting ring holder 26 is fixed to the gear box housing 17.

The Hall IC sensor 27 has a Hall element 27a and a circuit board 27b and functions to detect the density of magnetic flux produced at the radial air gaps of the paired magnetism collecting rings 24 and 25. The Hall element 27a is arranged in a middle position of a radial air gap defined between the paired magnetism collecting rings 24 and 25 while being in noncontact with the magnetism collecting rings 24 and 25. The circuit board 27b is connected to the Hall element 27a at an x-axis positive direction side of the magnetism collecting ring holder 26. An electric power from a battery of the vehicle is supplied to the Hall element 27a through the circuit board 27b, and an output of the Hall element 27a is led to the motor control circuit 15 through the circuit board 27b.

In the following, various portions or members that constitute the torque sensor 13 will be described in detail.

[Yoke Assembly]

Figure 3:
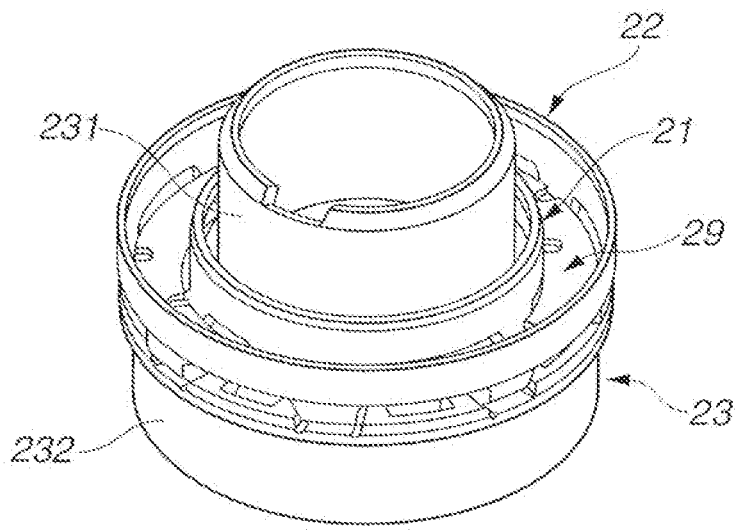
FIG. 3 is a perspective view of a yoke assembly employed in the first embodiment.
Figure 4:
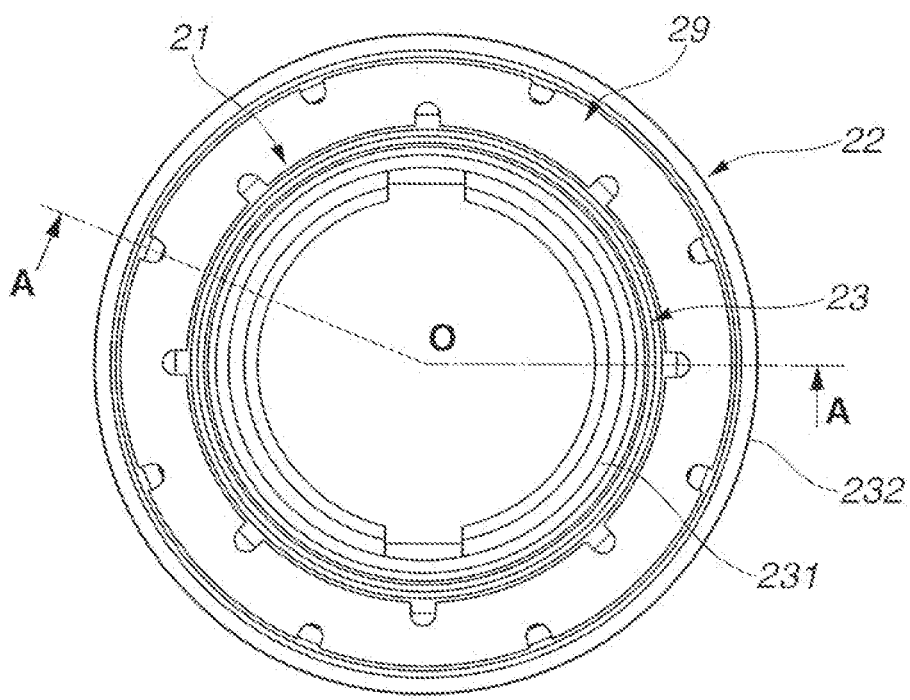
FIG. 4 is a plan view of the yoke assembly employed in the first embodiment.

FIG. 3 is a perspective view of a yoke assembly employed in the first embodiment, FIG. 4 is a plan view of the yoke assembly employed in the first embodiment, (and FIG. 5) is an exploded perspective view of the yoke assembly employed in the first embodiment.

The yoke assembly comprises the paired yokes 21 and 22, the yoke holder 23 and the welding plate (first holding member) 29. The welding plate 29 and the yoke holder 23 constitute a holding member.

The first yoke (first detecting member, first yoke member) 21 has the eight pawl portions (first pawl portions) 211, the annular portion (first annular portion) 212 and connecting portions (first connecting portions) 213. The pawl portions 211 are plate members that are arranged to face the multipolar magnet 20 in the magnetic field of the multipolar magnet 20, and leading end of each pawl portion is tapered. The connecting portions 213 are shaped flat and extend radially outward from the annular portion 212 to connect the annular portion 212 to the pawl portions 211. Each pawl portion 211 is arranged to extend perpendicular to a radial direction of the rotation axis O, and each connecting portion 213 is arranged to extend perpendicular to the rotation axis O.

The second yoke (second detecting member, second yoke member) 22 has the eight pawl portions (second pawl portions) 221, the annular portion (second annular portion) 222 and connecting portions (second connecting portions) 223. The pawl portions 221 are plate members that are arranged to face the multipolar magnet 20 in the magnetic field of the multipolar magnet 20, and leading end of each pawl portion 221 is tapered. Each pawl portion 221 has the same length as each pawl portion 211 in the x-axis direction. The annular portion 222 is larger in diameter than the annular portion 212 of the first yoke 21. The annular portion 222 has the same axial length as the annular portion 212 in the x-axis direction. The connecting portions 223 are shaped flat and extend radially inward from the annular portion 222 to connect the annular portion 222 and the pawl portions 221. Each pawl portion 221 is arranged to extend perpendicular to a radial direction of the rotation axis O and alternately placed between adjacent pawl portions 211 and 211 of the first yoke 21, and each connecting portion 223 is arranged to extend perpendicular to the rotation axis O.

Figure 6:
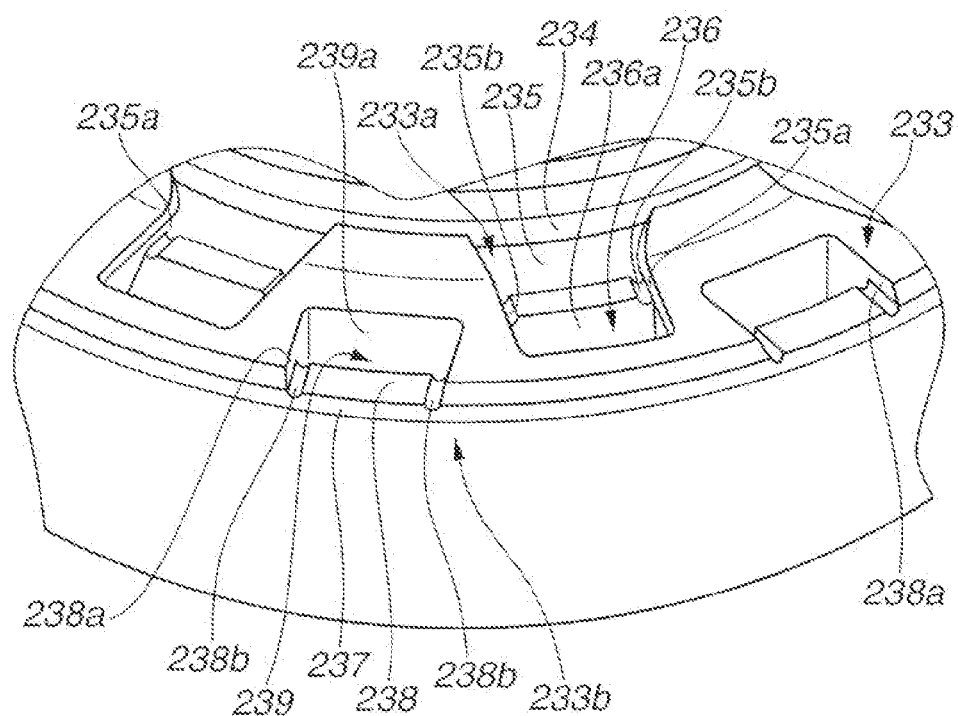
FIG. 6 is an enlarged view of an essential part of a yoke holder 23 employed in the first embodiment.

FIG. 6 is an enlarged view of an essential portion of the yoke holder 23 employed in the first embodiment.

The yoke holder 23 has a smaller diameter portion 231, a larger diameter portion 232 and a holder portion 233. An inner diameter of the smaller diameter portion 231 is substantially the same as an outer diameter of the steering shaft 2 and a cylindrical inner wall of the smaller diameter portion 231 is fixed to a cylindrical outer wall of the steering shaft 2. The larger diameter portion 232 is larger in diameter than the smaller diameter portion 231, and receives therein the pawl portions 211 and 221 of the first and second yokes 21 and 22. The holder portion 233 is arranged to extend perpendicular to the rotation axis O and connects an x-axis negative direction end of the smaller diameter portion 231 and an x-axis positive direction end of the larger diameter portion 232. The holder portion 233 is provided with both first yoke connecting portions 233a to which the first yoke 21 is connected and second yoke connecting portions 233b to which the second yoke 22 is connected. Once the first yoke 21 is connected to the first yoke connecting portions 233a and the second yoke 22 is connected to the second yoke connecting portions 233b, the pawl portions 211 of the first yoke 21 and the pawl portions 221 of the second yoke 22 are alternately arranged.

The first yoke connecting portion 233a is shaped like an external gear in a planar view in accordance with the shape of the first yoke 21 and comprises an annular recessed portion 234 that is in contact with the annular portion 212, recessed portions 235 that receive the connecting portions 213 and through openings 236 through which the pawl portions 211 pass. Each recessed portion 235 is provided at circumferential ends thereof with stepped surfaces (directional rotation restricting portions) 235a by which a rotational movement of a corresponding connecting portion 213 of the first yoke around the rotation axis O is restricted. The length of each stepped surface 235a in the x-axis direction (that is, the depth of the recessed portion 235) is smaller than the length of the connecting portion 213 in the x-axis direction. Furthermore, each recessed portion 235 is provided at circumferential ends thereof with respective grooves 235b. When the first yoke 21 is connected to the first yoke connecting portion 233a, an inner cylindrical surface (radial positioning restricting portion) 236a of each through opening 236 that faces an inner cylindrical surface of the corresponding pawl portion 211 is brought into contact with the inner surface of the corresponding pawl portion 211. The inner cylindrical surface 236a is positioned at an x-axis positive direction side relative to the multipole magnet 20.

The second yoke connecting portion 233b is shaped like an internal gear in a planar view in accordance with the shape of the second yoke 22 and comprises an annular recessed portion 237 that is in contact with the annular portion 222, recessed portions 238 that receive the connecting portions 223 and through openings 239 through which the pawl portions 221 pass. The annular recessed portion 237 and the recessed portions 238 are placed at the same x-axis direction positions as the annular recessed portion 234 and the recessed portions 235. Each recessed portion 238 is provided at circumferential ends thereof with stepped surfaces (directional rotation restricting portions) 238a by which a rotational movement of the corresponding connecting portion 223 around the rotation axis O is restricted. The length of each stepped surface 238a in the x-axis direction (that is, the depth of the recessed portion 238) is smaller than the length of the connecting portion 223 in the x-axis direction. Furthermore, each recessed portion 238 is provided at circumferential ends thereof with respective grooves 238b. When the second yoke 22 is connected to the second yoke connecting portion 233b, an inner cylindrical surface (radial positioning restricting portion) 239a of each through opening 239 that faces an inner cylindrical surface of the corresponding pawl portion 221 is brought into contact with the inner surface of the pawl portion 221. The inner cylindrical surface 239a is positioned at an x-axis positive direction side relative to the multipole magnet 20.

Figure 7:
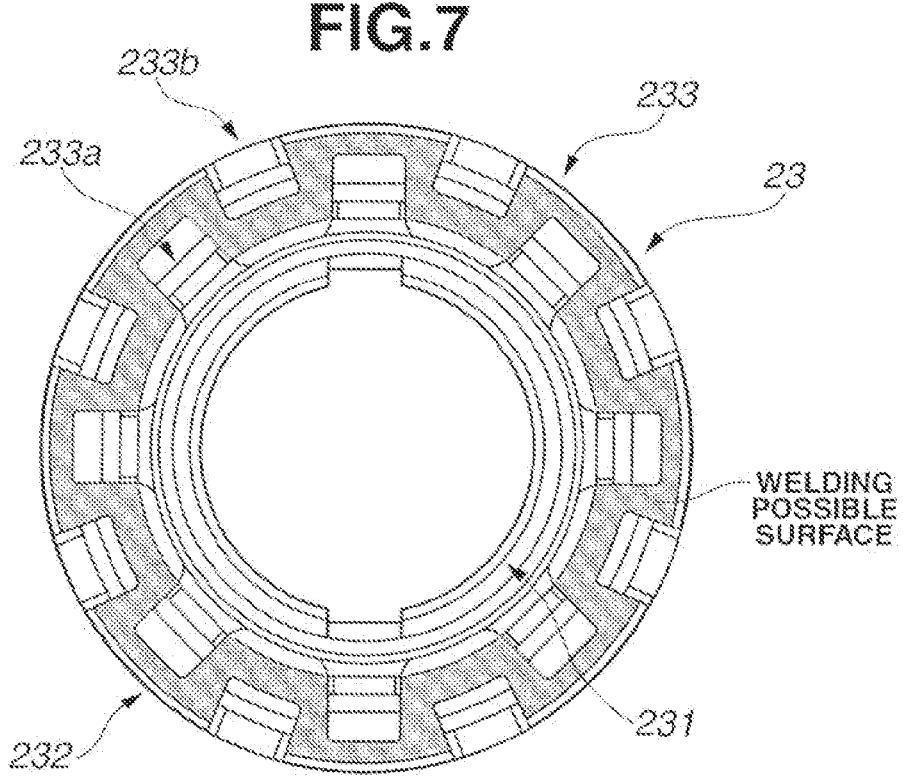
FIG. 7 is a view showing a surface of the yoke holder 23 where welding is possible.

As will be understood from FIG. 7, a zigzag part (viz., the hatched portion of FIG. 7) that is the holder portion 233 except the first yoke connecting portion 233a and the second yoke connecting portion 233b has a welding possible surface to which the welding plate 29 can be welded.

Figure 8:
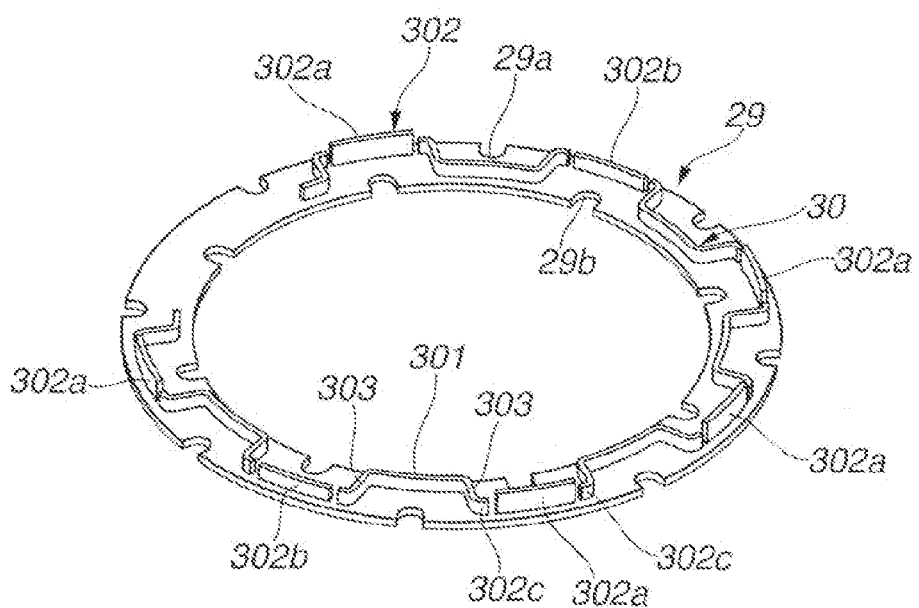
FIG. 8(a) is a perspective view of a welding plate 29 employed in the first embodiment.
FIG. 8(b) is a plan view of the welding plate 29 employed in the first embodiment.
Figure 8:
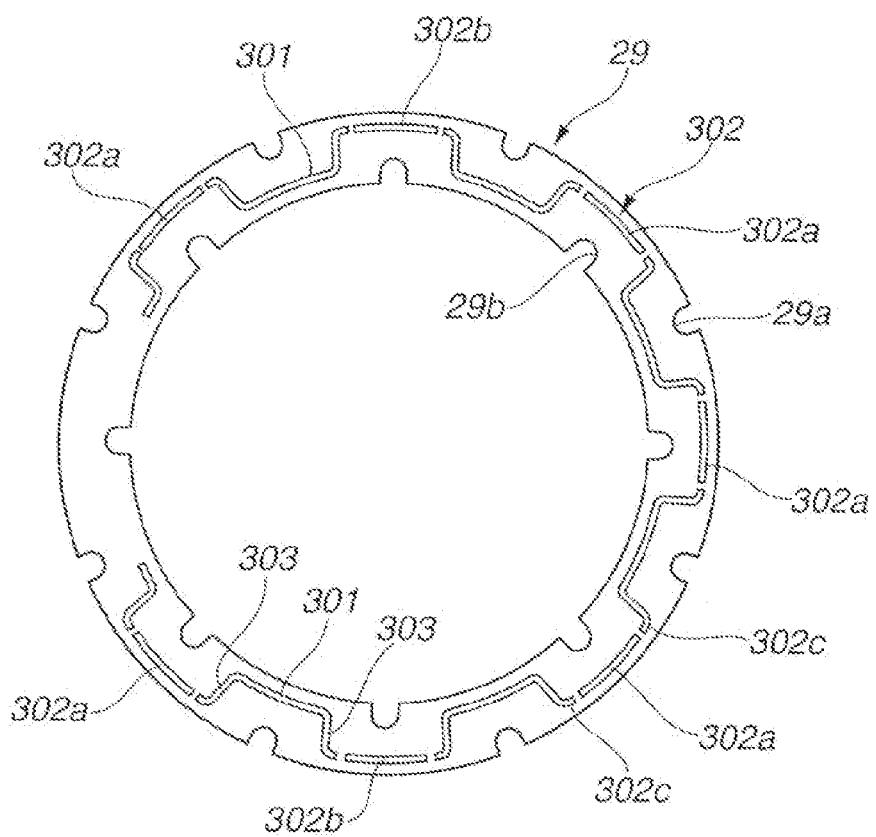

FIG. 8(a) is a perspective view of the welding plate 29 employed in the first embodiment, and FIG. 8(b) is a plan view of the welding plate 29 employed in the first embodiment.

The welding plate 29 is constructed of a thermoplastic resin and shaped into an annular member that has an inner diameter larger than the diameter of the smaller diameter portion 231 of the yoke holder 23 and an outer diameter smaller than the diameter of the larger diameter portion 232. The welding plate 29 is formed at an outer peripheral edge thereof with equally spaced eight cuts 29a and at an inner peripheral edge thereof with equally spaced eight cuts 29b. The cuts 29a and the cuts 29b are alternately arranged while taking different positions in circumferential direction. The welding plate 29 has on one surface thereof a welding portion 30 that extends in about ¾ of the circular area.

Figure 9:
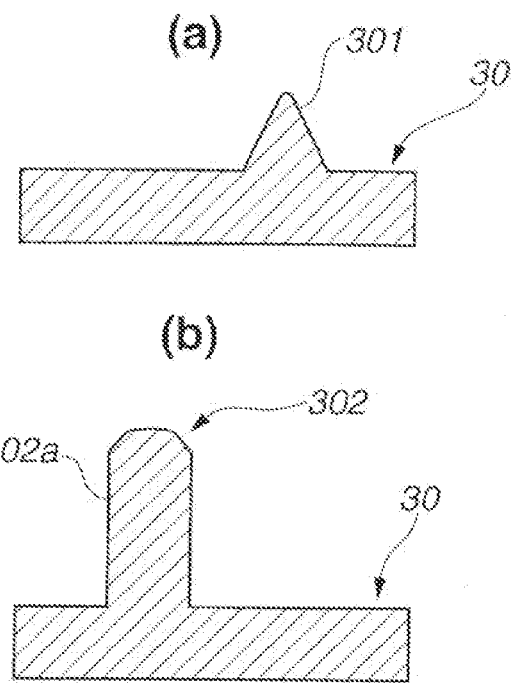
FIG. 9(a) is a vertically sectioned view of a smaller diameter portion 301 employed in the first embodiment.
FIG. 9(b) is a vertically sectioned view of an engaging projected portion 302a employed in the first embodiment.
Figure 10:
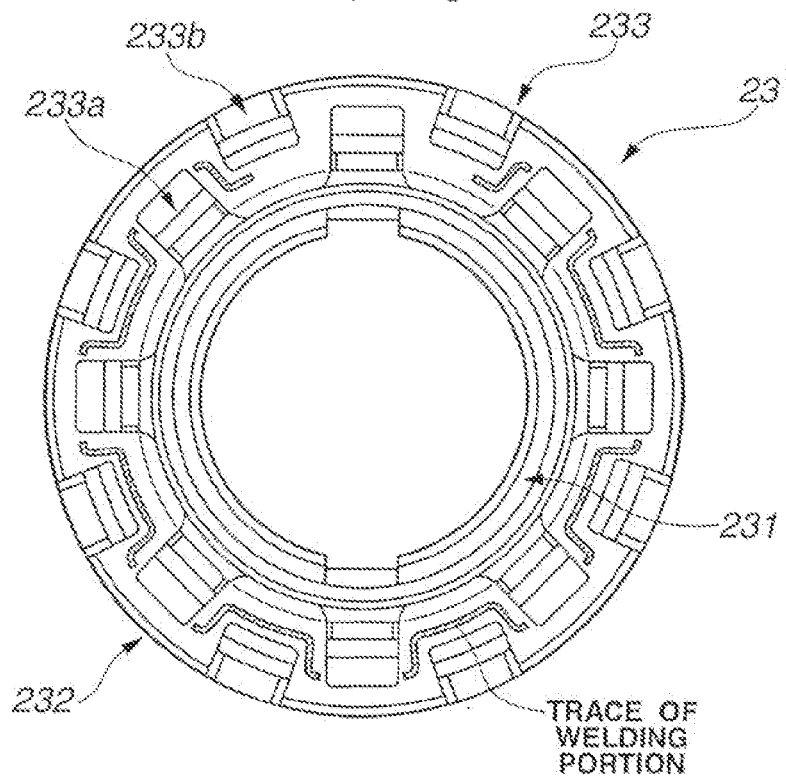
FIG. 10 is a view showing a welded portion that is produced when the welding plate 29 is welded to a holder portion 233 in the first embodiment.

The welding portion 30 has a zigzag shape and comprises a smaller diameter portion 301 that passes inside the connecting portions 223, a larger diameter portion 302 that passes radially outside the connecting portions 213 and radially extending connecting portions 303 that connect the smaller diameter portion 301 and the larger diameter portion 302. The smaller diameter portion 301 is welded to a welding possible surface of the holder portion 233 that is placed radially inside the through openings 239. The radially extending connecting portions 303 are welded to a welding possible surface of the holder portion 233 that is placed between a group of the through openings 236 and another group of the through openings 239. FIG. 9(a) is a vertically sectioned view of the smaller diameter portion 301, and the smaller diameter portion 301 has a triangular cross section. Each radially extending connecting portion 303 has also a triangular cross section. The larger diameter portion 302 passes over the through openings 236 of the holder portion 233 at a radially outside of the pawl portions 211, and the larger diameter portion 302 includes engaging projected portions (positioning engaging portions) 302a, non-engaging portions 302b and cut portions 302c. FIG. 9(b) is a vertically sectioned view of each of the engaging projected portions 302a, and each engaging projected portion 302a is longer in the x-axis direction than the smaller diameter portion 301 and each radially extending connecting portion 303, and the engaging projected portions 302a are engaged with the through openings (positioning engaging portions) 236. Each of the non-engaging portions 302b has the same vertical cross section as the smaller diameter portion 301 shown in FIG. 9(a). The cut portions 302c are provided at circumferential ends of each engaging projected portion 302a as well as at circumferential ends of each non-engaging portion 302b, and the cut portions 302a have such shapes as would be provided when the smaller diameter portion 301 and each radially extending connecting portion 303 are cut in the positive direction along the x-axis. FIG. 10 shows the welded portion that is produced when the welding plate 29 is welded to the holder portion 233.

Figure 11:
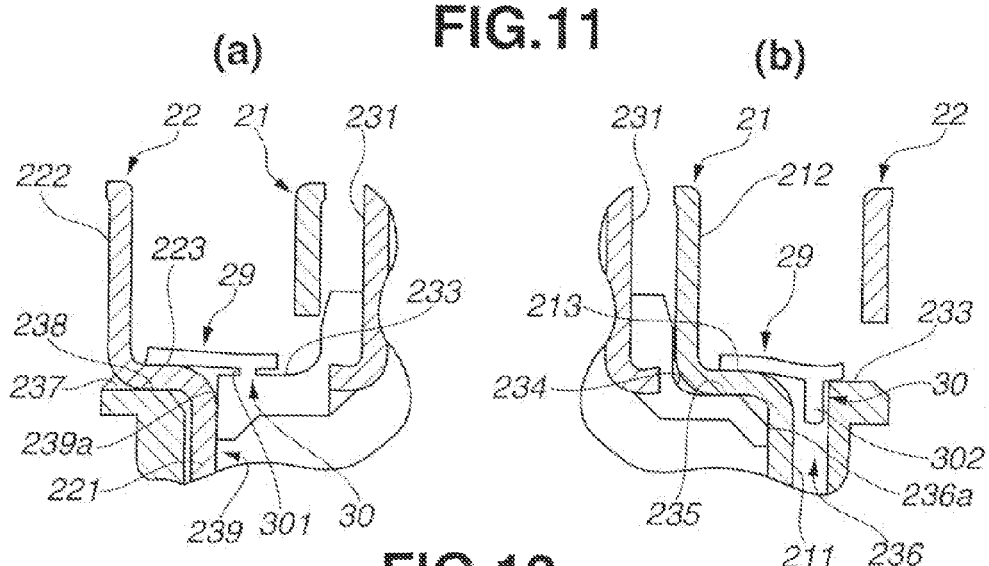
FIGS. 11(a) and 11(b) are enlarged sectional views taken along the line A-A of FIG. 4.

FIG. 11 is an enlarged sectional view of an essential portion taken along the line A-A of FIG. 4.

By contacting the welding plate 29 to the connecting portions 233 of the second yoke 22 at a radially outside portion (holding portion) of the smaller diameter portion 301 that is welded and fixed to the holder portion 233, the second yoke 22 is held between the yoke holder 23 and the welding plate 29. Furthermore, by contacting the welding plate 29 to the connecting portions 213 of the first yoke 21 at a radially outside portion (holding portion) of the larger diameter portion 302, the first yoke 21 is held between the yoke holder 23 and the welding plate 29. The contract surfaces between the connecting portions 213 and 223 of the paired yokes 21 and 22 and the welding plate 29 are positioned at an x-axis positive direction side relative to the welding possible surface of the holder portion 233 and the welding plate 29 is made sufficiently thin as compared with an x-axis direction thickness of the smaller diameter portion 301 and the radially extending connecting portions 303, and thus, the welding plate 29 can be welded and fixed to the holder portion 233 while exhibiting a resiliency.

For producing the yoke assembly, the paired yokes 21 and 22 are put on the yoke holder 23 and then the welding plate 29 is put on them, and then the yoke holder 23 and the welding plate 29 are welded to each other by a ultrasonic welding technique. Since assembling the paired yokes 21 and 22 and the welding plate 29 to the yoke holder 23 can be entirely carried out from one direction, the assembling work has a merit in workability.

[Magnetism Collecting Ring Assembly]

Figure 12:
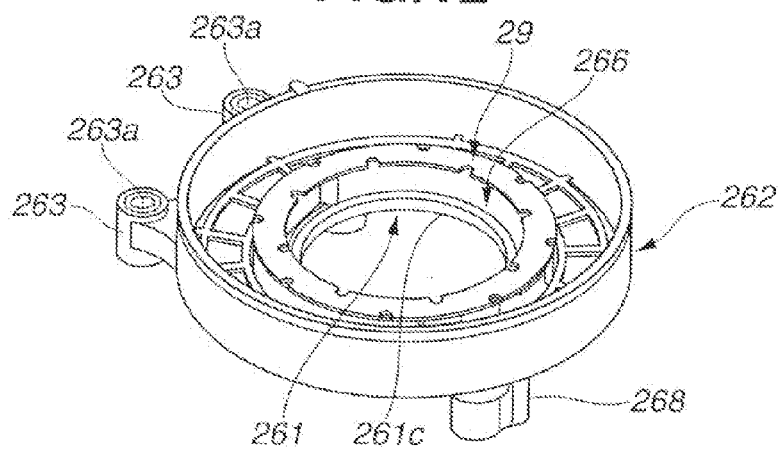
FIG. 12 is a perspective view of a magnetism collecting ring assembly employed in the first embodiment.
Figure 13:
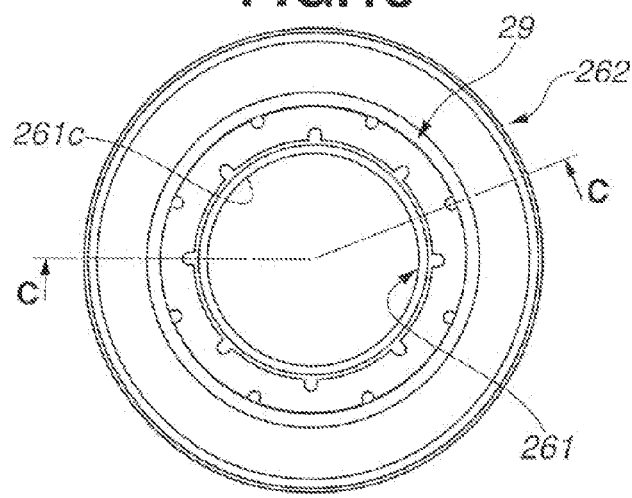
FIG. 13 is a bottom view of the magnetism collecting ring assembly employed in the first embodiment.
Figure 14:
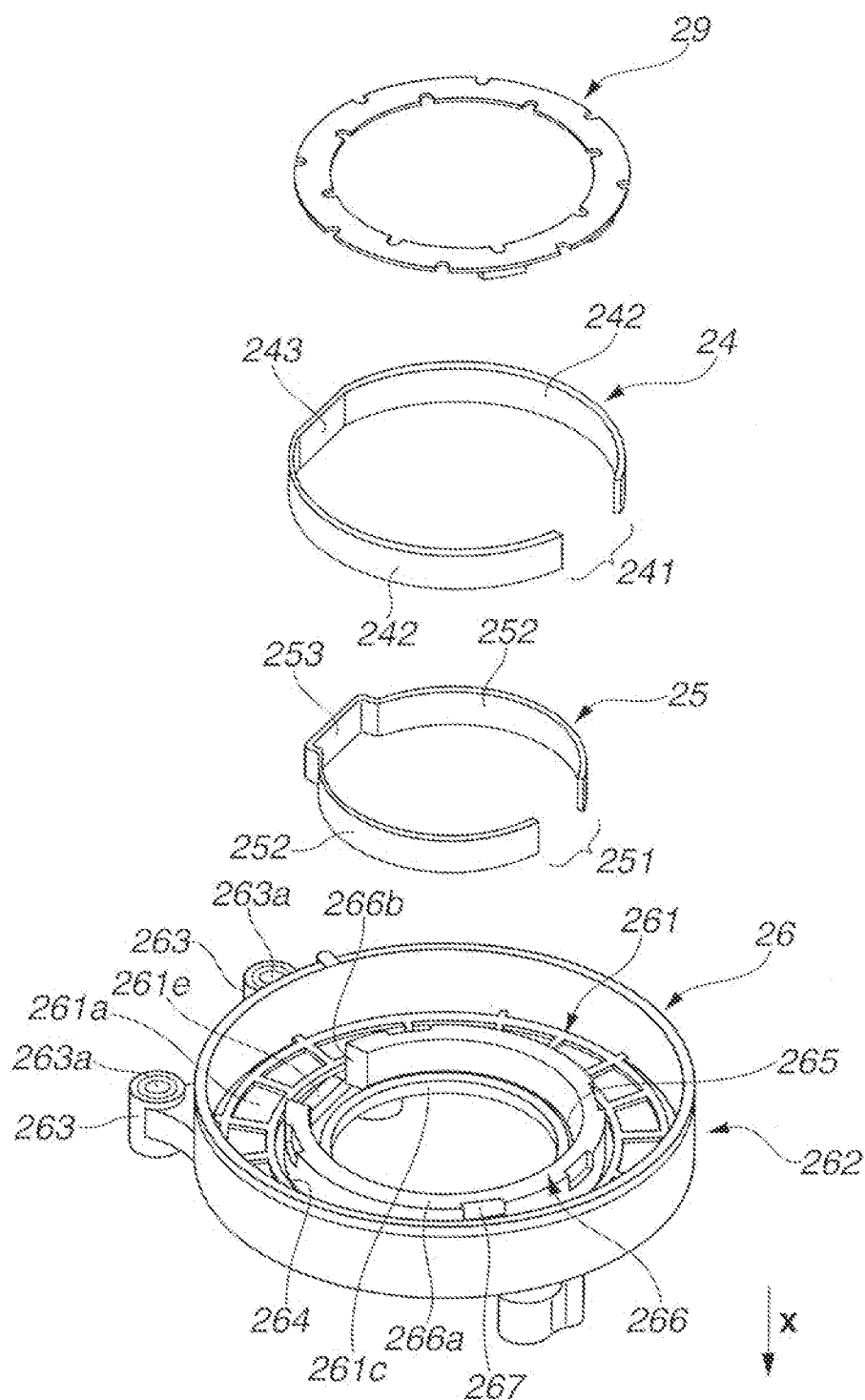
FIG. 14 is an exploded perspective view of the magnetism collecting ring assembly employed in the first embodiment.

FIG. 12 is a perspective view of a magnetism collecting ring assembly employed in the first embodiment. FIG. 13 is a bottom view of the magnetism collecting ring assembly employed in the first embodiment. FIG. 14 is an exploded perspective view of the magnetism collecting ring assembly employed in the first embodiment.

The magnetism collecting ring assembly is equipped with the paired magnetism collecting rings 24 and 25, the magnetism collecting ring holder 26 and the welding plate (first holding member) 29. The welding plate 29 and the magnetism collecting ring holder 26 constitute a holding member.

The first magnetism collecting ring (first detecting member) 24 is shaped to surround the rotation axis O and has a cut portion 241 that is provided at a circumferentially given part of the ring 24, a pair of arcuate portions 242 and 242 that are arranged to face each other while extending along an imaginary circle whose center is in the rotation axis O and a magnetism collecting portion (first detected portion) 243 that is provided at a position opposite to the cut portion 241 and connects the paired arcuate portions 242 and 242. The imaginary circle along which the paired arcuate portions 242 and 242 extend is larger in diameter than the annular portion 212 of the first yoke 21 and smaller in diameter than the annular portion 222 of the second yoke 22. The magnetism collecting portion 243 is shaped to extend perpendicular to the rotation axis O.

The second magnetism collecting ring (second detecting member) 25 is shaped to surround the rotation axis O and has a cut portion 251 that is provided at a circumferentially given part of the ring 25, a pair of arcuate portions 252 and 252 that are arranged to face each other while extending along an imaginary circle whose center is in the rotation axis O and a magnetism collecting portion (first detected portion, second detecting member side engaging portion) 253 that is provided at a position opposite to the cut portion 251 and connects the paired arcuate portions 252 and 252. The imaginary circle along which the arcuate portions 252 and 252 extend is smaller in diameter than the imaginary circle of the first magnetism collecting ring 24 and larger in diameter than the annular portion 212 of the first yoke 21. The magnetism collecting portion 253 is projected radially outward and shaped to extend perpendicular to the rotation axis O.

Figure 15:
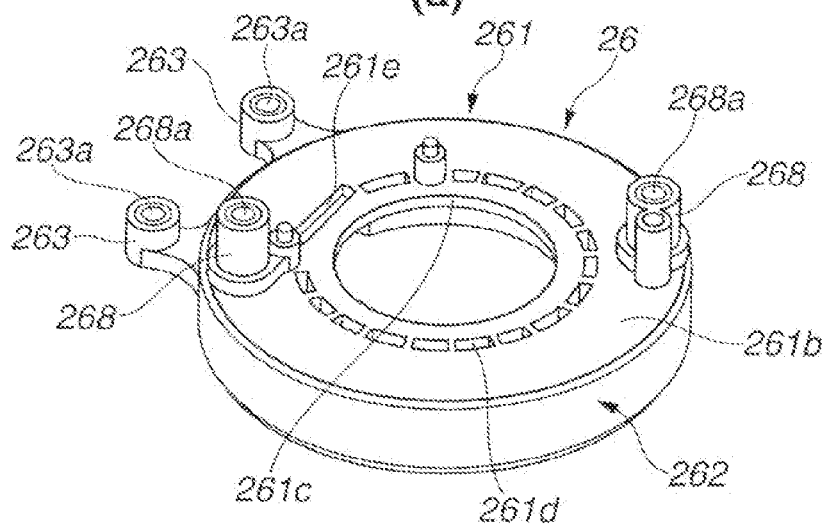
FIG. 15(a) is a perspective view of a magnetism collecting ring holder 26 employed in the first embodiment.
FIG. 15(b) is a plan view of the magnetism collecting ring holder 26 employed in the first embodiment.
FIG. 15(c) is a sectional view taken along the line B-B of FIG. 15B.
Figure 15:
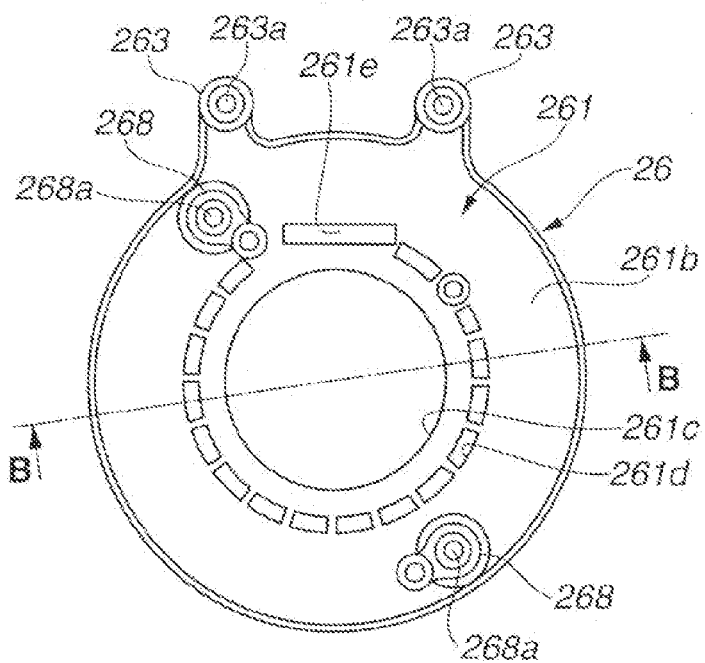
Figure 15:
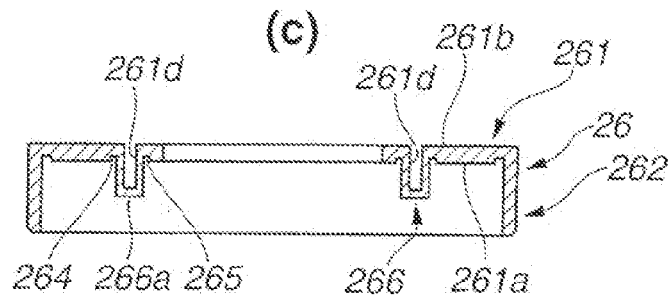

FIG. 15(a) is a perspective view of the magnetism collecting ring holder 26 employed in the first embodiment, FIG. 15(b) is a plan view of the magnetism collecting ring holder 26 employed in the first embodiment and FIG. 15(c) is a sectional view taken along the line B-B of FIG. 15(b).

The magnetism collecting holder 26 has an annular portion 261 that has an opening 261c at a center portion, an outer cylindrical portion 262 that extends in an x-axis negative direction from a peripheral edge of the annular portion 261, and two cylindrical pole portions 263 and 263 that extend in an x-axis positive direction from the annular portion 261.

The opening 261c of the annular portion 261 is larger in diameter than an outer diameter of the yoke holder 23. An x-axis negative direction side surface 261a of the annular portion 261 is formed with a first engaging groove (detecting member engaging portion) 264 that receives an x-axis positive direction end portion of the first magnetism collecting ring 24 and a second engaging groove (detecting member engaging portion) 265 that receives an x-axis positive direction end portion of the second magnetism collecting ring 25. Between the first engaging groove 264 and the second engaging groove 265, there is provided a circular arc-shaped wall portion (C-shaped in a planar view) (engaging projection for second detecting member) 266 that is cut at a portion where the magnetism collecting portion 243 of the first magnetism collecting ring 24 and the magnetism collecting portion 253 of the second magnetism collecting ring 25 are positioned. When the first magnetism collecting ring 24 and the second magnetism collecting ring 25 are fitted to the first engaging groove 264 and the second engaging groove 265 respectively, the paired arcuate portions 242 and 242 of the first magnetism collecting ring 24 contact with an outer surface of the circular arc-shaped wall portion 266 and the paired arcuate portions 252 and 252 of the second magnetism collecting ring 25 are contact with an inner surface of the circular arc-shaped wall portion 266. At the same time, the magnetism collecting portion 253 of the second magnetism collecting ring 25 contacts with end surfaces 266b and 266b of the cut of the circular arc-shaped wall portion 266. The magnetism collecting portions 243 and 253 of the paired magnetism collecting rings 24 and 25 are arranged to face each other in the cut of the circular arc-shaped wall portion 266. An x-axis negative direction surface 266a of the circular arc-shaped wall portion 266 is shaped to extend perpendicular to the rotation axis O, and the x-axis negative direction surface 266a is formed with engaging openings 267 that are engaged with the engaging projected portions 302a of the welding portion 30 of the welding plate 29 when the welding plate 29 is going to be welded to the surface 266a. An x-axis direction distance from each of the first engaging groove 264 and second engaging groove 165 to the x-axis negative direction surface 266a of the circular arc-shaped wall portion 266 is set smaller than an x-axis direction length of each of the first magnetism collecting ring 24 and the second magnetism collecting ring 25.

Figure 16:
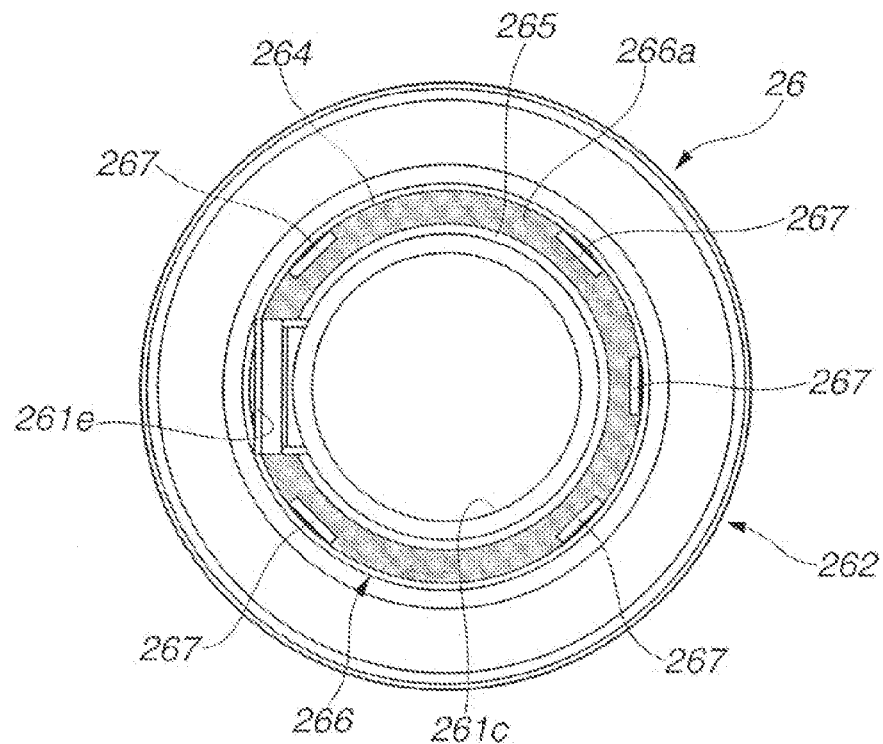
FIG. 16 is a view showing a surface of the magnetism collecting ring holder 26 employed in the first embodiment where welding is possible.

As is seen from FIG. 16, the x-axis negative direction surface 266a of the circular arc-shaped wall portion 266 except the engaging openings 267 (viz., hatched portion of FIG. 16) provides a welding possible surface to which the welding plate 29 cart be welded.

An x-axis positive direction surface 261b of the annular portion 261 is formed with cylindrical pole portions 268 that support the circuit board 27b of the Hall IC sensor 27. Each cylindrical pole portion 268 is formed with a threaded screw hole 268a for fixing the circuit board 27b thereto by a screw.

The x-axis positive direction surface 261b is formed, at a circular portion corresponding to the circular arc-shaped wall portion 266, with circularly arranged small recesses 261d each being opened to an x-axis positive direction.

The annular portion 261 is formed, at a portion that provides a radial air gap between the paired magnetism collecting portions 243 and 253, with a through opening 261e through which the Hall IC sensor 27 passes. A sensor part of the Hall IC sensor 27 is arranged in a middle position of the radial air gap.

An x-axis negative direction side end portion of the outer cylindrical portion 262 has such an outer diameter as to allow insertion thereof into the shaft container portion 17a (see FIG. 2) of the gear box housing 17.

The cylindrical pole portions 263 have each a threaded screw hole 263a for fixing the magnetism collecting holder 26 to the gear box housing 17 by screws.

The welding plate 29 has the same construction as the afore-mentioned welding plate 29 applied to the yoke assembly. However, unlike in the case where the welding plate 29 is welded to the holder portion 233, the non-engaging portions 302b of the welding plate 29, which are to be welded to the circular arc-shaped wall portion 266, provide a welding portion.

Figure 17:
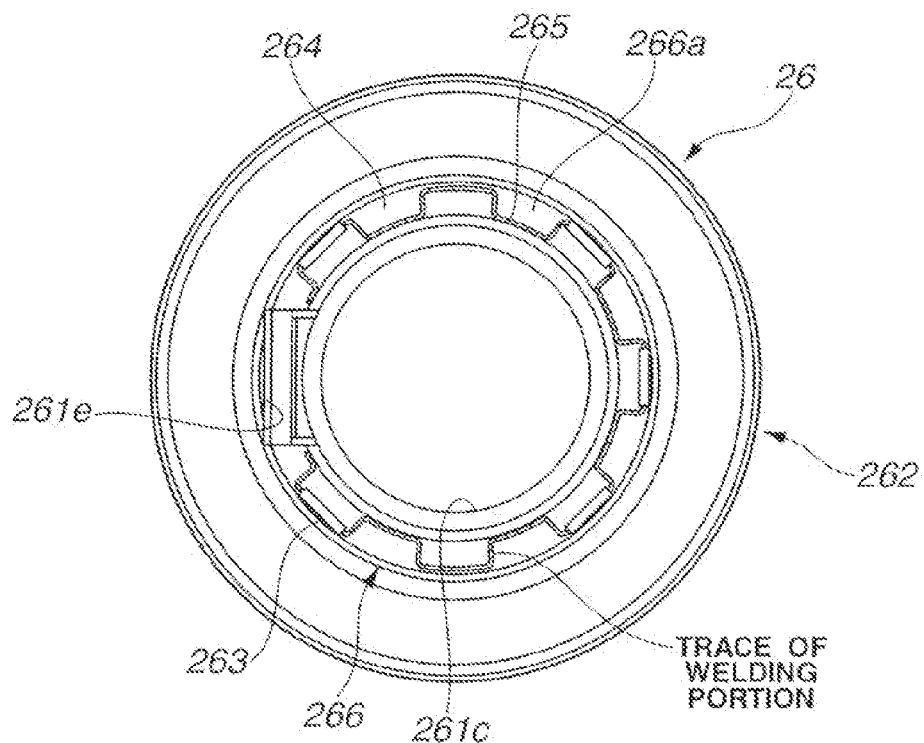
FIG. 17 is a view showing a welded portion produced when the welding plate 29 of the first embodiment is welded to an x-axis negative direction surface 266a of a circular arc-shaped wall portion 266.

FIG. 17 shows a trace of the welding portion that appears when the welding plate 29 employed in the first embodiment is welded to the x-axis negative direction surface 266a of the circular arc-shaped wall portion 266.

Figure 18:
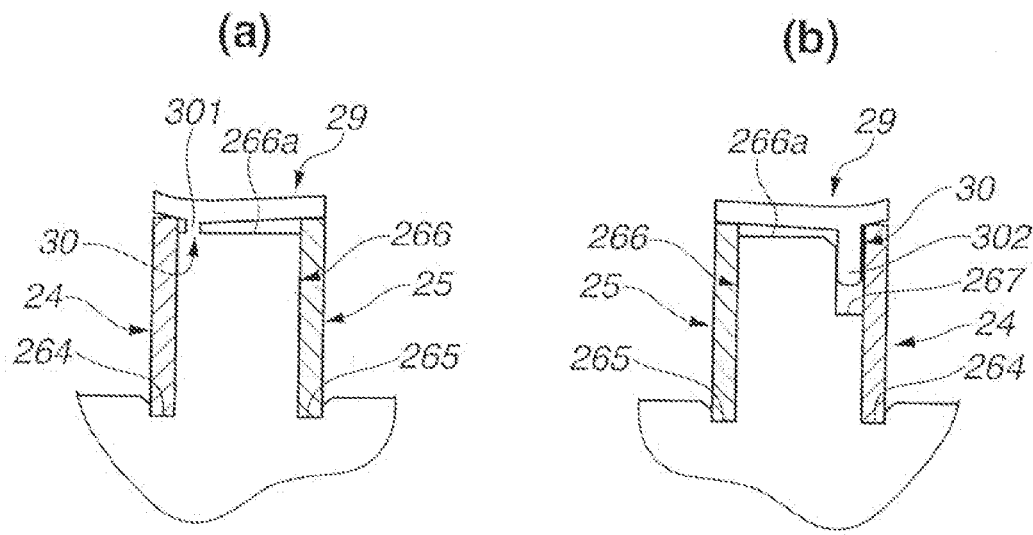
FIGS. 18(a) and 18(b) are enlarged sectional views taken along the line C-C of FIG. 13.

FIG. 18 is an exploded sectional view of an essential part taken along the line C-C of FIG. 13.

By contacting a radially outside portion (holding portion) of the welding portion 30 of the welding plate 29 to the first magnetism collecting ring 24, the first magnetism collecting ring 24 is held between the magnetism collecting ring holder 26 and the welding plate 29. Furthermore, by contacting a radially inside portion (holding portion) of the welding portion 30 to the second magnetism collecting ring 25, the second magnetism collecting ring 25 is held between the magnetism collecting ring holder 26 and the welding plate 29. Contact surfaces between the paired magnetism collecting rings 24 and 25 and the welding plate 29 are positioned at an x-axis positive direction side as compared with the welding possible surface of the circular arc-shaped wall portion 266. Since the welding plate 29 is made sufficiently thin as compared with the thickness in the x-axis direction of the smaller diameter portion 301 and the radially extending connecting portions 303, the welding plate 29 is welded and fixed to the circular arc-shaped wall portion 266 while exhibiting a resiliently deformable characteristic.

For producing the magnetism collecting ring assembly, the paired magnetism collecting rings 24 and 25 are put on the magnetism collecting ring holder 26 and then the welding plate 29 is put on them, and then the magnetism collecting ring holder 26 and the welding plate 29 are welded to each other by a ultrasonic welding technique. Since assembling the paired magnetism collecting rings 24 and 25 and the welding plate 29 to the magnetism collecting ring holder 26 can be entirely carried out from one direction, the assembling work has a merit in workability. Furthermore, since the welding plate 29 is the one used for producing the yoke assembly, increase in number of the component parts can be suppressed and thus cost reduction can be realized.

In the following, operation of the torque sensor 13 employed in the first embodiment will be described.

In case where no torque is inputted, the circumferentially center position defined by the pawl portions 211 and 221 is placed at a polar border of the multipole magnet 20. In this case, the pemeance of the pawl portions 211 and 221 to N-poles and that of the pawl portions to the S-poles to the multipole magnet 20 are equal, and thus, the magnetic fluxes produced by N-poles of the multipole magnet 20 are led to the pawl portions 211 and 221 and then directly to S-poles of the multipole magnet 20. Accordingly, between the paired magnetism collecting rings 24 and 25, there is no magnetic flux flow, and thus the Hall IC sensor 27 outputs an intermediate voltage.

When a driver turns the steering wheel 1, the torsion bar 3 produces a twist deformation causing the steering shaft 2 and the pinion shaft 4 to have a relative angular displacement therebetween. This relative angular displacement brings about a production of a relative angular displacement between the pawl portions 211 and 221 and the multipole magnet 20. Upon production of the relative angular displacement between the pawl portions 211 and 221 and the multipole magnet 20, the pemeance balance is broken and thus the magnetic fluxes are forced to flow in a magnetic circuit including the Hall IC sensor 27. That is, upon production of the relative angular displacement, the magnetic fluxes produced from N-poles of the multipole magnet 20 flow to larger area portions of the pawl portions 211 and 221 that face N-poles, flow to the paired magnetism collecting rings 24 and 25 and return to S-poles of the multipole magnet 20 from larger area portions of the pawl portions that face S-poles. Under this condition, by detecting the magnetic fluxes flowing between the paired magnetism collecting rings 24 and 25 by the Hall IC sensor 27, the relative angular displacement is measured and thus the torque applied to the torsion bar 3 can be detected.

In the following, effects of the first embodiment will be described.

When, in known rotation detecting devices, it is intended to hold a detecting member by a holding member produced through an insert molding, an internal stress tends to be produced in the detecting member due to a cooling shrinkage of the holding member, which causes deterioration in detecting precision.

While, in the yoke assembly employed in the first embodiment, the welding plate 29 and the yoke holder 23 are welded and fixed to each other in such a manner as to sandwich therebetween the paired yokes 21 and 22 that extend in the x-axis direction. Accordingly, the paired yokes 21 and 22 are suppressed from producing an internal stress that would be caused by the cooling shrinkage due to the insert molding. Thus, undesired distortion of the paired yokes 21 and 22 is suppressed and thus the detecting precision of the torque sensor 13 can be increased. Furthermore, since the two yokes 21 and 22 are held by paired holding members (namely, welding plate 29 and yoke holder 23), it is not necessary to prepare the welding plate for each yoke, and thus the number of component parts can de reduced. Furthermore, due to increase in torque detecting precision, the control precision of the steering assist force by the electric power steering device can be increased.

In the magnetism collecting ring assembly employed in the first embodiment, the welding plate 29 and the magnetism collecting ring holder 26 are welded and fixed to each other in such a manner as to sandwich therebetween the paired magnetism collecting rings 24 and 25 that extend in the x-axis direction. Accordingly, the paired magnetism collecting rings 24 and 25 are suppressed from producing an internal stress that would be caused by the cooling shrinkage due to the insert molding. Thus, distortion of the paired magnetism collecting rings 24 and 25 is suppressed and thus the detecting precision of the torque sensor 13 can be increased. Furthermore, since the two magnetism collecting rings 24 and 25 are held by paired holding members (viz., welding plate 29 and the magnetism ring holder 26), it is not necessary to prepare a welding plate for each magnetism collecting ring, and thus the number of component parts can be reduced. Furthermore, due to increase in torque detecting precision, the control precision of the steering assist force by the electric power steering device can be increased.

In the paired yokes 21 and 22, the connecting portions 213 and 223 that connect the pawl portions 211 and 221 to the annular portions 212 and 222 are arranged to extend perpendicular to the rotation axis O. With this arrangement, both the paired yokes 21 and 22 can be welded and fixed to each other at one time by the welding plate 29 and the yoke holder 23. Furthermore, since the connecting portions 213 and 223 are arranged on a flat imaginary surface (viz., arranged to extend perpendicular to the rotation axis O), the welding between the welding plate 29 and the yoke holder 23 can be carried out in proximity of each other. Thus, the height (viz., the dimension in the x-axis direction) of a welded portion can be reduced, and thus, the rigidity of the welded portion can be increased.

In the welding portion 30 of the welding plate 29, the smaller diameter portion 301 is welded to a welding possible surface of the yoke holder 23 that is placed radially inside the through openings 239 of the holder portion 233 of the yoke holder 23, and the radially extending connecting portions 303 are welded to a welding possible surface of the yoke holder 23 that is placed between the through openings 236 and the through openings 239 of the holder portion of the yoke holder 23. That is, the actually welded portion between the welding plate 29 and the yoke holder 23 includes circumferentially extending portions and radially extending portions, and thus, the welded portion length can be increased, and thus, increase in welding strength is obtained.

The welding plate 29 is formed at the welding portion 30 thereof with the engaging projected portions 302a that are engaged with the through openings 236 of the yoke holder 23. In case of welding the welding plate 29 to the yoke holder 23, it is important to establish a relative positioning therebetween in a rotational direction. By providing a positioning device that includes the engaging projected portions 302a and the through openings 236, the relative positioning precision in the rotational direction can be increased. As a result, the welding portion 30 of the welding plate 29 can be set at a desired position.

Figure 19:
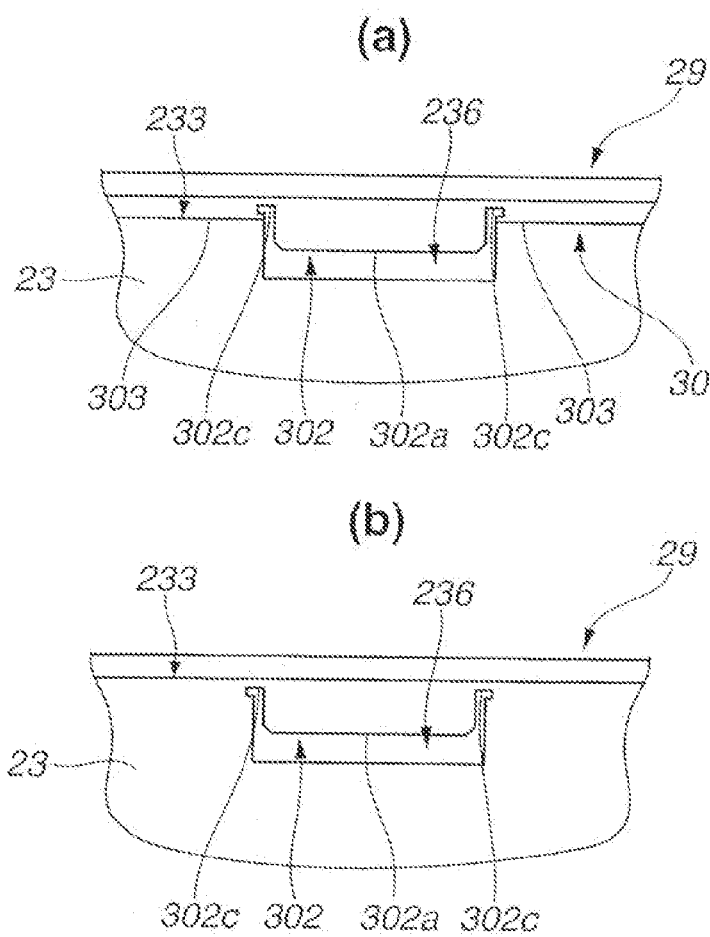
FIG. 19(a) is an enlarged view of an essential part of the yoke assembly in a condition prior to the welding process.
FIG. 19(b) is an enlarged view of the essential part of the yoke assembly in a condition after the welding process.

The larger diameter portion 302 of the welding portion 30 is formed with the cut portions 302c at circumferential ends of each engaging projected portion 302a and at circumferential ends of each non-engaging portion 302b. FIG. 19(a) is an enlarged view of an essential part of the yoke assembly in a condition prior to the welding process, and FIG. 19(b) is an enlarged view of the essential part of the yoke assembly in a condition after the welding process. The smaller diameter portion 301 and the radially extending connecting portions 303 of the welding portion 30 are welding portions that are welded to the holder portion 233 of the yoke holder 23, while the engaging projected portions 302a and the non-engaging portions 302b of the welding portion 30 are non-welding portions that are not welded to the holder portion 233 of the yoke holder 23. When the engaging projected portions 302a are positioned near the welding portion, there is such a possibility that the heat of fusion produced is caught by the engaging projected portions 302a that have a larger mass. This phenomenon tends to increase a possibility of defective welding of ends of the engaging projected portions. This defective welding causes a high possibility of undesired lift of the welding plate 29 relative the yoke holder 23. While, in the embodiment, by providing the cut portions 302c between the welding portion and each engaging projected portion 302a, the transfer of the fusion heat toward the engaging projected portions is suppressed and thus the undesired lift of the welding plate can be prevented. This advantage is expected by also the non-engaging portions 302b.

The holder portion 233 of the yoke holder 23 is formed with recessed portions 235 and 238 for receiving the connecting portions 213 and 223 of the paired yokes 21 and 22. Thus, when the paired yokes 21 and 22 are set in the holder portion 233, the recessed portions 235 and 238 can neatly receive the connecting portions 213 and 223 and thus, the welding plate 29 and the yoke holder 23 can be brought close to each other in the x-axis direction. As a result, the length of the welded portion in the x-axis direction can be reduced and thus an assembling stability of these parts prior to the welding process can be increased.

At both ends of each recessed portion 235 or 238, there are provided the stepped surfaces 235a or 238a by which a rotational movement of the connecting portions 213 or 223 around the rotation axis O is suppressed. With this arrangement, the positioning of the paired yokes 21 and 22 in a rotation direction relative to the welding plate 29 and the yoke holder 23 can have an increased precision.

At circumferential ends of each recessed portion 235 or 238, there are formed the grooves 235b or 238b. The circumferential ends of each recessed portion 235 or 238 are portions that face both ends of each connecting portion 213 or 223, and thus, when the paired yokes 21 and 22 are produced through a press molding, such portions tend to produce burrs. By providing the circumferential ends of each recessed portion 235 or 238 with respective portions that are deeper than other portion, the undesired burrs can be neatly put into the deeper respective portions. Accordingly, the paired yokes 21 and 22 can be positioned to each other keeping the flat surface of each connecting portion 213 or 223 in contact with the flat surface of each recessed portion 235 or 238, and thus, the mounting accuracy of the connecting portions 213 and 223 relative to the welding plate 29 and the yoke holder 23 can be increased.

The holder portion 233 of the yoke holder 23 is formed with through openings 236 and 239 through which the pawl portions 211 and 221 of the paired yokes 21 and 22 pass. Due to the construction in which the pawl portions 211 and 221 are inserted into the through openings 236 and 239 of the holder portion 233, disengagement of the pawl portions 211 and 221 from the through openings and a rotational movement of the pawl portions around the rotation axis O are suppressed, and thus, assembling stability in a condition where the paired yokes 21 and 22 are mounted to the yoke holder 23 can be increased.

When the paired yokes 21 and 22 are set to the yoke holder 23, the inner cylindrical surfaces 236a and 239a of the through openings 236 and 239 are brought into contact with inner surfaces of the pawl portions 211 and 221. It is important for the paired yokes 21 and 22 to have an assured concentricity relative to the multipolar magnet 20. By providing the yoke holder 23 with the inner cylindrical surfaces 236a and 239a that contact with the inner cylindrical surfaces of the pawl portions 211 and 221, the concentricity of the paired yokes 21 and 22 relative to the multipolar magnet 20 can be increased.

The inner cylindrical surfaces 236a and 239a of the through openings 236 and 239 are spaced from the multipolar magnet 20 in the x-axis direction. Since the inner cylindrical surfaces 236a and 239a are not overlapped with the multipolar magnet 20 in the x-axis direction, they can be overlapped in a radial direction, and thus a size reduction in the radial direction is achieved.

The magnetism collecting ring holder 26 is formed at the annular portion 261 with the circular arc-shaped wall portion 266 that effects both a circumferential positioning of the second magnetism collecting ring 25 by engaging with the magnetism collecting portion 253 of the second magnetism collecting ring 25 and a radial relative positioning of the first magnetism collecting ring 24. With this arrangement, the accuracy of the circumferential positioning of the second magnetism collecting ring 25 and that of the relative positioning of the first magnetism collecting ring 24 can be increased.

The welding portion 30 of the welding plate 29 comprises the smaller diameter portion 301 that is in contact with and welded to a radially inside portion of the x-axis negative direction surface 266a of the circular arc-shaped wall portion 266, the larger diameter portion 302 (non-engaged portion 302b of the portion 302) that is in contact with and welded to a radially outside portion of the x-axis negative direction surface 266a and the radially extending connecting portions 303 that are circularly and alternately arranged while connecting the smaller and larger diameter portions 301 and 302. With such arrangement, the welded portion is shaped to have a zigzag form and thus, a welding length can be increased, and furthermore, the larger diameter portion 302 of the welded portion contributes to improvement in holding the first magnetism collecting ring 24 and the smaller diameter portion 301 contributes to improvement in holding the second magnetism collecting ring 25.

The circular arc-shaped wall portion 266 is formed at the x-axis positive direction surface 261b with the plurality of small recesses 261d. Due to provision of such recesses 261d, the mass of the circular arc-shaped wall portion 266 can be reduced and radiation of the heat of fusion can be restrained. Furthermore, moldability of the circular arc-shaped wall portion 266 can be increased.

The annular portion 261 is formed at the x-axis negative direction side surface 261a with both the first engaging groove 264 that receives the x-axis positive direction end portion of the first magnetism collecting ring 24 and the second engaging groove 265 that receives the x-axis positive direction end portion of the second magnetism collecting ring 25. With this arrangement, the positioning accuracy of the paired magnetism collecting rings 24 and 25 prior to and after the welding fitting process can be increased.

The portion of the welding plate 29 except the welding portion 30 is shaped to have a smaller thickness in the x-axis direction, and thus, after the welding fitting process, the smaller thickness portion can be resiliently deformable. Then, the welding plate 29 is welded and fixed to the holder portion 233 while keeping the resilient deformability thereof. Thus, the resilient deformability of the welding plate 29, that is, the resilient deformation of the welding plate 29 can produce a biasing force applied to the paired yokes 21 and 22, and thus, the force for holding the paired yokes 21 and 22 can be increased.

The contact surfaces between the connecting portions 213 and 223 of the paired yokes 21 and 22 and the welding plate 29 are positioned at the x-axis positive direction side as compared with the welding possible surface of the holder portion 233. Accordingly, in case of welding and fixing the welding plate 29 to the holder portion 233, the welding portion becomes placed at the x-axis negative direction side as compared with the contact surfaces. As a result, due to the resiliency of the welding plate 29, the holding force for the paired yokes 21 and 22 can be increased.

The portion of the welding plate 29 except the welding portion 30 is shaped to have a smaller thickness in the x-axis direction, and thus, after the welding and fixing, the smaller thickness portion is resiliently deformable. Then, the welding plate 29 is welded and fixed to the circular arc-shaped wall portion 266 while being resiliently deformable. Thus, the flexible deformation of the welding plate 29, that is, a resilient deformation of the same provides a biasing force applied to the paired magnetism collecting rings 24 and 25, and thus, the holding force for the paired magnetism collecting rings 24 and 25 can be increased.

The contact surfaces between the magnetism collecting rings 24 and 25 and the welding plate 29 are placed at the x-axis positive direction side as compared with the welding possible surface of the circular arc-shaped wall portion 266. Accordingly, in case of welding and fixing the welding plate 29 to the circular arc-shaped wall portion 26, the welding portion becomes placed at the x-axis negative direction side as compared with the contact surfaces. As a result, due to the resiliency of the welding plate 29, the holding force for the paired magnetism collecting rings 24 and 25 can be increased.

In the following, constructions employed in the first embodiment and effects expected from the constructions will be described.

(1) A construction employed in the embodiment comprises the pinion shaft 4 and the steering shaft 4 that are rotatable relative to each other around the rotation axis O, the multipole magnet 20 that has N-poles and S-poles alternately arranged around the rotation axis O, the detecting member (a pair of yokes 21 and 22) that is arranged to face the multipole magnet 20 and constructed of a magnetic material, the holding member that is connected to the steering shaft 2 and includes the welding plate 29 made of a thermoplastic resin and the yoke holder 23 in which by welding and fixing the welding plate 29 and the yoke holder 23 to each other having the detecting member put therebetween, so that the holding member can hold the detecting member while avoiding a contact between the detecting member and the steering shaft 2, and the Hall IC sensor 27 that detects a relative rotation between the pinion shaft 4 and the steering shaft 2 by sensing a change of magnetic field in the detecting member caused by a relative rotation between the multipole magnet 20 and the detecting member caused by the relative rotation between the pinion shaft 4 and the steering shaft 2.

Since the paired yokes 21 and 22 are suppressed from producing an internal stress caused by cooling contracture accompanied by an insert molding, deformation of the paired yokes 21 and 22 is suppressed and thus the detecting accuracy of the torque sensor 13 can be increased.

(2) A construction employed in the first embodiment comprises the pinion shaft 4 and the steering shaft 4 that are rotatable relative to each other around the rotation axis O, the multipole magnet 20 that has N-poles and S-poles alternately arranged around the rotation axis O, the detecting member (a pair of magnetism collecting rings 24 and 25) that is arranged to face the multipole magnet 20 and constructed of a magnetic material, the holding member that is connected to the steering shaft 2 and includes the welding plate 29 made of a thermoplastic resin and the magnetism collecting holder 26 in which by welding and fixing the welding plate 29 and the magnetism collecting holder 26 to each other having the detecting member put therebetween, so that the holding member can hold the detecting member while avoiding a contact between the detecting member and the steering shaft 2, and the Hall IC sensor 27 that detects a relative rotation between the pinion shaft 4 and the steering shaft 2 by sensing a change of magnetic field in the detecting member caused by a relative rotation between the multipole magnet 20 and the detecting member accompanied by the relative rotation between the pinion shaft 4 and the steering shaft 2.

Since the paired magnetism collecting rings 24 and 25 are suppressed from producing an internal stress caused by cooling contracture accompanied by an insert molding, deformation of the paired magnetism collecting rings 24 and 25 is suppressed and thus the detecting accuracy of the torque sensor 13 can be increased.

(3) A construction employed in the first embodiment is so made that the detecting member is constructed to have the first yoke 21 and the second yoke 22 that is separate from the first yoke 21, and the holding member holds the first and second yokes 21 and 22 by putting therebetween the first and second yokes 21 and 22 while avoiding a contact therebetween.

That is, the two yokes 21 and 22 are held by the paired holding members (viz., the welding plate 29 and the yoke holder 23), and thus, it is not necessary to prepare the welding plate for each yoke, and thus the number of component parts can be reduced.

(4) A construction employed in the first embodiment is so made that the detecting member is constructed to have the first magnetism collecting ring 24 and the second magnetism collecting ring 25 that is separate from the first magnetism collecting ring 24, and the holding member holds the first and second magnetism collecting rings 24 and 25 by putting therebetween the first and second magnetism collecting rings 24 and 25 while avoiding a contact therebetween.

That is, the two magnetism collecting rings 24 and 25 are held by the paired holding members (viz., the welding plate 29 and the magnetism collecting holder 26), and thus, it is not necessary to prepare the welding plate for each magnetism collecting ring, and thus, the number of component parts can be reduced.

(5) A construction employed in the first embodiment comprises the gear box housing 17 that holds therein the first and second yokes 21 that are rotatable around the rotation axis O and the pinion shaft 4 and the steering shaft 2 are connected through the torsion bar 3. The detecting member comprises the first yoke 21 that is constructed to have the plate-like pawl portions 211 that are concentrically arranged around the rotation axis O while facing the multipole magnet 20, the annular portion 212 that is shaped to be concentric with the rotation axis O, the connecting portions 213 that connect the plate-like pawl portions 211 and the annular portion 212 and extend radially outward, and the magnetism collecting portion 253 of the second magnetism collecting ring 25 that is connected to the annular portion 212, in which the plate-like pawl portions 211 extend perpendicular to a radial direction of the rotation axis O, and the plate-like connecting portions 213 extend perpendicular to the rotation axis O and the second yoke 22 that is constructed to have the plate-like pawl portions 221 that are concentrically arranged around the rotation axis O while having the multipole magnet 20, the annular portion 222 that is shaped to be concentric with the rotation axis O, the connecting portions 223 that connect the plate-like pawl portions 221 and the annular portion 222 and extend radially inward, and the magnetism collecting portion 243 of the first magnetism collecting ring 24 that is connected to the annular portion 222, in which the plate-like pawl portions 221 extend perpendicular to a radial direction of the rotation axis (and alternately arranged with the plate-like pawl portions 211, the pawl portions 211 and the pawl portions 221 are arranged on a common circle provided around the rotation axis O, the annular portion 222 is spaced apart from the annular portion 212, each of the plate-like connecting portions 223 extends perpendicular to the rotation axis O and the connecting portions 223 are alternately arranged with the connecting portions 213. The Hall IC sensor 27 is mounted to the gear box housing 17 and has a Hall element 27a that detects a torque produced between the pinion shaft 4 and the steering shaft 2 by sensing a change of magnetic field between the magnetism collecting portion 243 and the magnetism collecting portion 253, which is caused by a change of a relative angle between the multipole magnet 20 and each of the pawl portions 211 and 221, which is caused by a twist deformation of the torsion bar 3. The holding member holds the first and second yokes 21 and 22 by putting the connecting portions 213 and 223 between the welding plate 29 and the yoke holder 23 and thereafter welding and fixing the welding plate 29 and the yoke holder 23 to each other.

Accordingly, the paired yokes 21 and 22 can be welded and fixed to each other by the welding plate 29 the yoke holder 23 all at once. Furthermore, since the welding plate 29 and the yoke plate 23 can be welded and fixed to each other while being placed in close position, the dimension in the x-axis direction cart be reduced and the rigidity of the welded portion can be increased.

(6) A construction employed in the first embodiment is so made that the portion where the welding plate 29 and the yoke holder 23 are welded and fixed to each other includes a smaller diameter portion that passes radially inside the connecting portions 213 and a radially extending portion that extends radially outward from the smaller diameter portion.

That is, by constructing the portion where the welding plate 29 and the yoke holder 23 are welded and fixed to each other, by an circularly extending portion and a radially extending portion, a longer welding length is obtained as compared with a case where only the circularly extending portion is used for the welding, and thus, increased welding strength is obtained.

(7) A construction employed in the first embodiment comprises the steering shaft 2 that is rotated upon rotation of the steering wheel 1, and the pinion shaft 4 that is connected to the steering shaft 2 through the torsion bar 3. The construction further comprises the steering mechanism 9 through which a steering operation of the steering wheel 1 is transmitted to the steered road wheels 8 and 8, the gear box housing 17 that rotatably holds the steering shaft 2 and the pinion shaft 4, the multipole magnet 20 mounted to the pinion shaft 4 and has N-poles and S-poles alternately arranged around the rotation axis O, the pair of yokes 21 and 22 that are arranged to face the multipole magnet 20 and made of a magnetic material, the holding member that holds the paired yokes 21 and 22 while avoiding contact between the paired yokes 21 and 22 and the steering shaft 2 and is fixed to the steering shaft 2, the holding member including the welding plate 29 of a thermoplastic resin and the yoke holder 23 in which the welding plate and the yoke holder 23 are welded and fixed to each other having the detecting member put therebetween, the Hall IC sensor 27 that is mounted to the gear box housing 17 for detecting a relative rotation between the steering shaft 2 and the pinion shaft 4 by sensing a change of magnetic field in the paired yokes 21 and 22 which is caused by a relative rotation between the multipole magnet 20 and the paired yokes 21 and 22 which is accompanied by a relative rotation between the steering shaft 2 and the pinion shaft 4, the electric motor 10 that provides the steering mechanism 9 with a steering assist force, and the motor control circuit 15 that calculates an instruction signal for the electric motor 10 based on a torque that is produced between the steering shaft 2 and the pinion shaft 4 and derived from an output signal from the Hall IC sensor 27.

Since the paired yokes 21 and 22 are suppressed from producing an internal stress that would be caused by the cooling shrinkage due to the insert molding, undesired distortion of the paired yokes 21 and 22 is suppressed and thus the detecting precision of the torque sensor 13 can be increased. As a result, the control precision for the steering assist force can be increased.

(8) A construction employed in the first embodiment comprises the steering shaft 2 that is rotated upon rotation of the steering wheel 1, and the pinion shaft 4 that is connected to the steering shaft 2 through the torsion bar 3. The construction further comprises the steering mechanism 9 through which a steering operation of the steering wheel 1 is transmitted to the steered road wheels 8 and 8, the gear box housing 17 that rotatably holds the steering shaft 2 and the pinion shaft 4, the multipole magnet 20 mounted to the pinion shaft 4 and has N-poles and S-poles alternately arranged around the rotation axis O, the pair of yokes 21 and 22 that are arranged to face the multipole magnet 20 and made of a magnetic material, the holding member that holds the paired yokes 21 and 22 while avoiding contact between the paired magnetism collecting rings 24 and 25 and the steering shaft 2 and is fixed to the steering shaft 2, the holding member including the welding plate 29 of a thermoplastic resin and the magnetism collecting holder 26 in which the welding plate 29 and the magnetism collecting holder 26 are welded and fixed to each other having the detecting member put therebetween, the Hall IC sensor 27 that is mounted to the gear box housing 17 for detecting a relative rotation between the sheering shaft 2 and the pinion shaft 4 by sensing a change of magnetic field in the paired magnetism collecting rings 24 and 25 which is caused by a relative rotation between the multipole magnet 20 and the paired magnetism collecting rings 24 and 25 which is accompanied by a relative rotation between the steering shaft 2 and the pinion shaft 4, the electric motor 10 that provides the steering mechanism 9 with a steering assist force, and the motor control circuit 15 that calculates an instruction signal for the electric motor 10 based on a torque that is produced between the steering shaft 2 and the pinion shaft 4 and derived from an output signal from the Hall IC sensor 27.

Since the paired magnetism collecting rings 24 and 25 are suppressed from producing an internal stress that would be caused by the cooling shrinkage due to the insert molding, undesired distortion of the paired magnetism collecting rings 24 and 25 is suppressed and thus the detecting precision of the torque sensor 13 can be increased. As a result, the control precision for the steering assist force can be increased.

Other Embodiments

Although, in the above, an embodiment of the present invention has been described, the present invention is not limited to the above-mentioned one. That is, the present invention is not limited to the construction shown in the above-mentioned embodiment and suitable design changes that don't deviate from the essential feature of the present invention are contained in the present invention.

Although in the embodiment an example in which the invention is applied to a torque sensor, the invention can be applied to a rotation sensor. In this case, the second member is mounted to the housing.

Furthermore, the poles of the magnetic member may be one N-pole or more and one S-pole or more.

Furthermore, the portion where the welding plate 29 and the yoke holder 23 are welded and fixed to each other may comprise a smaller diameter portion that passes radially inside of the connecting portions, a larger diameter portion that passes radially outside of the connecting portions 223 and a radially extending portion that connects the smaller and larger diameter portions. With this arrangement, the portion where the welding and fixing are made has a generally wave-shaped construction and thus the welding length can be much more increased.

In the following, technical ideas that are thought out from the above-mentioned embodiment but separated from those defined by Claims will be described.

(a) In the rotation detecting device as defined in Claim 3, a characterization is further employed in which the first holding member and the second holding member are provided with positioning engaging portions by which a relative positioning therebetween in the rotational direction around the rotation axis is carried out.

Since, in the welding and fixing technique, the positioning in the rotational direction is important, provision of such positioning engaging portions can improve the positioning precision in the rotation direction.

(b) In the rotation detecting device as defined in item (a), a characterization is further employed in which the positioning engaging portions comprise engaging projected portions that are formed on the first holding member and extend in the direction of the rotation axis, and engaging recessed portions that are formed on the second holding member and face toward the engaging projected portions, in which when it is assumed that a direction around the rotation axis is a circumferential direction, the first holding portion has, at circumferential both ends of the engaging projected portion, a welding portion that is projected in a direction to face the second holding member and welded in a welding and fixing process, and has cutout recessed portions that are arranged at a border area between the welding portion and the engaging projected portion and face the second holding member, so that even after completion of the welding and fixing between the first and second holding members, the first and second holding members are kept separated from each other.

In case where the welding portion and the engaging projected portion are arranged adjacent to each other, the welding heat is received by the engaging projected portion, which tends to induce a lack of fusion of portions of the welding portion that are welded to the engaging projected portion. This lack of fusion tends to cause an undesired lift of the first holding member relative to the second holding member. However, due to provision of the cutout recessed portions, the transfer of the welding heat toward the engaging projected portion is suppressed and thus the undesired lift can be prevented.

(c) In the rotation detecting device as defined in Claim 3, a characterization is further employed in which the first holding member or the second holding member is provided with recessed portions for receiving therein the first and second connecting portions.

Since the recessed portions can absorb the thickness of the first and second connecting portions, the first and second holding members can be arranged adjacent to each other. As a result, the axial length of the welding portion can be reduced, and thus, after the first and second yoke members are arranged to the first and second holding members, the assembling stability of these parts prior to the welding process can be increased.

(d) In the rotation detecting device as defined by item (c), a characterization is further employed in which the recessed portions are provided with rotational movement suppressing portions by which rotational movement of the first and second connecting portions around the rotation axis is suppressed.

The positioning precision in the rotation direction of the first and second yoke members relative to the holding members can be increased.

(e) In the rotation detecting device as defined by item (c), a characterization is further employed in which when it is assumed that a direction around the rotation axis is a circumferential direction, circumferential both ends of each recessed portion have each a depth that is greater than a depth of other portions.

The circumferential both ends of the recessed portion are portions to which end portions of the first and second connecting portions are to be placed. That is, when the first and second yoke members are produced through a press molding, undesired burrs tend appear at such portions. Due to provision of such deeper both ends of each recessed portion, the burrs can be neatly received by the deeper both ends, and thus, an assembling precision of the first and second connecting portions relative to the holding members can be increased.

(f) In the rotation detecting device as defined by Claim 3, a characterization is further employed in which the first holding member or the second holding member is formed with a plurality of through openings through which the first and second pawl portions pass while extending along the rotation axis.

Due to the construction in which the first and second pawl portions stick into the holding member, an assembling stability in a condition where the first and second yoke members are mounted to the holding members can be increased.

(g) In the rotation detecting device as defined by Claim 3, a characterization is further employed in which the first holding member or the second holding member is provided with a radial positioning establishing portion that establishes a radial positioning of the first and second yoke members relative to the rotation axis by contacting with inner cylindrical surfaces of the first pawl portions and inner cylindrical surfaces of the second pawl portions.

For the first and second yoke members, coaxiality of them to the magnet member is important. For increasing an axial center position accuracy of the first and second yoke members, the radial positioning establishing portion that is contactable with the inner cylindrical surfaces of the first and second pawl portions is provided to the holding member. With this, the coaxiality of the first and second yoke members relative to the magnetic member is increased.

(h) In the rotation detecting device as defined by item (g), a characterization is further employed in which the radial positioning establishing portion of the holding member is placed at a portion that is spaced apart from the magnetic member in the direction of the rotation axis.

Since the radial positioning establishing portion and the magnetic member are prevented from overlapping in the axial direction, both members can be overlapped in a radial direction and thus, the dimension in the radial direction can be reduced.

(i) In the rotation detecting device as defined by Claim 2, a characterization is further employed in which when it is assumed that a direction around the rotation axis is a circumferential direction, the first and second detecting members are each shaped to surround the rotation axis and have each a cut portion at a given portion and a pair of arcuate portions that are shaped to extend along imaginary circles whose center is defined by the rotation axis, the first detecting member is so shaped that a diameter of the imaginary circle along which the arcuate portions of the first detecting member extend is larger than a diameter of the other imaginary circle along which the arcuate portions of the second detecting member extend, the second detecting member is formed, at a portion opposite to the cut portion with respect to the rotation axis, with a second detecting member engaging portion that is defined between the paired arcuate portions, the holding member establishes positioning of the second detecting member in the circumferential direction by engaging with the second detecting member engaging portion, and the holding member has an engaging projection for the second detecting member by which positioning of the holding member in a radial direction relative to the first detecting member is established.

Thus, positioning of the second detecting member in the circumferential direction and relative positioning of the second detecting member relative to the first detecting member are improved in accuracy.

(j) In the rotation detecting device as defined by item (i), a characterization is further employed in which the second holding member is provided between the first and second detecting members and formed with a wall portion that projects toward the first detecting member, the first holding member holding member is formed with both a welding portion that is in contact with a surface of the wall portion of the second holding member that faces the first holding member and welded to the surface in the welding and fixing process, and holding portions that are provided at radially both sides of the welding portion and hold the first and second detecting members by contacting with the first and second detecting members, the welding portion of the first holding member comprises a smaller diameter portion that is in contact with and welded to a radially inside portion of the wall portion, a larger diameter portion that is in contact with and welded to a radially outside portion of the wall portion and connecting portions that connect the smaller and larger diameter portions and are arranged alternately in the circumferential direction.

Since the welding portion is shaped to have a zigzag form, the welding length can be increased, the larger diameter portion of the welding portion contributes to improvement in holding the first detecting member and the smaller diameter portion of the welding portion contributes to improvement in holding the second detecting member.

(k) In the rotation detecting device as defined by item (j), a characterization is further employed in which the second holding member is provided, at the wall portion thereof opposite to the first detecting member, with recess-shaped cut portions that open to the direction of the rotation axis.

Due to provision of the cut portions of the wall portion, the mass of the second holding member can be reduced, and radiation of the fusion heat can be suppressed.

(l) In the rotation detecting device as defined by item (i), a characterization is further employed in which the holding member is formed with a detecting member engaging portion that receives axial ends of the first and second detecting members with respect to the direction of the rotation axis, the detecting member engaging portion being recessed to open to the direction of the rotation axis.

The positioning accuracy of the first and second detecting members prior to and after the welding and fixing process can be increased.

(m) In the rotation detecting device as defined by Claim 1, a characterization is further employed in which the first holding member includes a welding portion that is in contact with the second holding member and welded and fixed to the second holding member in a welding and fixing process, and a holding portion that is provided at a radially inside or outside portion of the welding portion and in contact with axial ends of the detecting members with respect to the direction of the rotation axis, the holding portion of the first holding member has a thickness in the direction of the rotation axis that is smaller than that of the welding portion, and thus after the welding and fixing process, the smaller thickness portion is resiliently deformable.

The resilient deformation, that is, the resilient deformation produces a biasing force applied to the detecting members, and thus, a holding power for the detecting members is increased.

(n) In the rotation detecting device as defined by item (m), a characterization is further employed in which the second holding member is formed with both a second holding member side contact portion that is in contact with the welding portion of the first holding member and a detecting member receiving portion that receives the detecting members, and the detecting members are arranged in the second holding member in such a manner that the detecting members project toward the first member side from the second holding member side contact portion.

The second holding member side contact portion is recessed against the first holding member not against the detecting members. Accordingly, when it is intended to weld and fix the first holding member to the given portion, the first holding member of the welding portion is led into the recess of the second holding member, and thus, the holding portion becomes flexible thereby increasing the force for holding the detecting members.

(o) In the rotation detecting device as defined by item (m), a characterization is further employed in which the first holding member is welded and fixed to a given portion and resiliently deformed in such a manner that the welding portion projects toward the second holding member side crossing over the holding portion.

Due to the resilient deformation of the first holding member as mentioned hereinabove, the holding power for holding the detecting members is increased.

DESCRIPTION OF REFERENCE NUMERALS

1 . . . steering wheel
2 . . . steering shaft (second member, input shaft)
3 . . . torsion bar
4 . . . pinion shaft (first member, output shaft)
8 . . . steered road wheel
9 . . . steering mechanism
10 . . . electric motor
13 . . . torque sensor (rotation detecting device)

15 . . . motor control circuit
17 . . . gear box housing (housing)
20 . . . multipole magnet (magnetic member)
21 . . . first yoke (detecting member)
22 . . . second yoke (detecting member)
23 . . . yoke holder (holding member, second holding member)
24 . . . first magnetism collecting ring (detecting member)
25 . . . second magnetism collecting ring (detecting member)
26 . . . magnetism collecting holder (holding member, second holding member)
27 . . . Hall IC sensor (magnetic sensor)
29 . . . welding plate (holding member, first holding member)

The invention claimed is:

1. A rotation detecting device, comprising:
first and second members that are rotatable relative to each other around a rotation axis;
a magnetic member fixed to the first member, the magnetic member having N-poles and S-poles alternately arranged around the rotation axis;
at least one detecting member arranged to face the magnetic member, the at least one detecting member being constructed of a magnetic material;
first and second holding members fixed to the second member for holding the at least one detecting member, the holding members being constructed of thermoplastic resin and are welded and fixed to each other, wherein the at least one detecting member is disposed between the first and second holding members to prevent relative contact between the at least one detecting member and the second member; and
a magnetic sensor that detects a relative rotation between the first and second members by sensing a change of magnetic field in the at least one detecting member, wherein the change of magnetic field is caused by a relative rotation between the magnetic member and the at least one detecting member due to the relative rotation between the first and second members.

2. A rotation detecting device as claimed in claim 1, wherein:
the at least one detecting member includes a first detecting member and a second detecting member that is separate from the first detecting member; and
the first and second holding members hold the first and second detecting members between the holding members without contact between the first and second detecting members.

3. A rotation detecting device as claimed in claim 2, further comprising:
a housing which holds therein the first and second members such that the first and second members are rotatable around the rotation axis; and
a torsion bar through which the first and second members are connected to each other, wherein
the detecting members each comprises:
a first yoke member that includes
plate first pawl portions that are concentrically arranged around the rotation axis while facing the magnetic member,
a first annular portion that is shaped concentric with the rotation axis,
first connecting portions that respectively extend from the plate first pawl portions to the first annular portion, each of the plate first connecting portions extending radially outward, and
a first detected portion that is connected to the first annular portion, each of the plate first pawl portions extending perpendicular to a radial direction of the rotation axis, and each of the plate first connecting portions extending perpendicular to the rotation axis, and
a second yoke member that includes
plate second pawl portions that are concentrically arranged around the rotation axis while facing the magnetic member,
a second annular portion that is shaped concentric with the rotation axis,
plate second connecting portions that respectively extend from the plate second pawl portions to the second annular portion, each of the plate second connecting portions extending radially inward, and
a second detected portion that is connected to the second annular portion, each of the plate second pawl portions extending perpendicular to a radial direction of the rotation axis and being arranged between two neighboring plate first pawl portions of the plate first pawl portions, in which the plate first and second pawl portions are arranged on a common circle that is concentric with the rotation axis, the second annular portion is separate from the first annular portion, and the plate second connecting portions extend perpendicular to the rotation axis and are arranged alternately with the plate first connecting portions;
the magnetic sensor is a Hall element mounted to the housing,
the Hall element detects a torque produced between the first and second members by sensing a change of magnetic field between the first and second detected portions caused by a change of a relative angle between the plate first and second pawl portions and the magnetic member due to torsion of the torsion bar; and
the holding member holds the at least one detecting member by the first and second holding members, which are welded and fixed to each other, and the plate first and second connecting portions are disposed between the first and second holding members.

4. A rotation detecting device as claimed in claim 3, wherein:
a portion where the first and second holding members are welded and fixed to each other comprises
a smaller diameter portion that passes through a radially inside part of the plate first connecting portions,
a larger diameter portion that passes through a radially outside part of the plate second connecting portions, and
a radially extending connecting portion that connects the smaller and larger diameter portions.

5. A rotation detecting device as claimed in claim 3, wherein:
the first and second holding members are provided with positioning engaging portions by which positioning of the first and second holding members around the rotation axis is carried out.

6. A rotation detecting device as claimed in claim 5, wherein:
the positioning engaging portions comprise engaging projected portions that are provided by the first holding member and extend toward the rotation axis, and engaging recessed portions that are provided by the second holding member and face the engaging projected portions to receive therein the engaging projected portions, and when assuming that a direction around the rotation axis is a circumferential direction, the first holding member has, at circumferential ends of an engaging projected portion of the engaging projected portions, a welding portion that is projected to face the second holding member, and wherein the welding portion is welded in a welding and fixing process, and has recessed cutout portions that are arranged at a border area between the welding portion and one of the engaging projected portions, and which face the second holding member, and wherein even after completion of the welding and fixing between the first and second holding members, the first and second holding members are kept separated from each other.

7. A rotation detecting device as claimed in claim 3, wherein:

the first holding member or the second holding member is provided with a recessed portion for receiving therein the plate first and second connecting portions.

8. A rotation detecting device as claimed in claim 7, wherein:

the recessed portion is provided with a rotation suppressing portion by which a rotational movement of the first and second connecting members around the rotation axis is suppressed.

9. A rotation detecting device as claimed in claim 8, wherein:

when assuming that a direction around the rotation axis is a circumferential direction, a depth at circumferential ends of the recessed portion is larger than a depth of the plate first and second connecting portions.

10. A rotation detecting device as claimed in claim 3, wherein:

the first holding member or the second holding member is provided with a plurality of through openings through which the plate first and second pawl portions pass.

11. A rotation detecting device as claimed in claim 3, wherein:

the first holding member or the second holding member is provided with a radial movement restriction portion that restricts a radial movement of the first and second yoke members relative to the rotation axis by contacting with an inner cylindrical surface of each of the plate first pawl portions and an inner cylindrical surface of each of the plate second pawl portions.

12. A rotation detecting device as claimed in claim 11, wherein:

the radial movement restriction portion is provided at a position that is spaced apart from the magnetic member in the radial direction of the rotation axis.

13. A rotation detecting device as claimed in claim 2, wherein:

when assuming that a direction around the rotation axis is a circumferential direction, the first and second detecting members are arranged to surround the rotation axis and each has, at a given circumferential portion, a cut portion and a pair of circular arc-shaped portions that extend along an imaginary circle whose center is in the rotation axis, a diameter of an imaginary circle along which the pair of circular arc-shaped portions of the first detecting member extend is larger than an imaginary circle along which the pair of circular arc-shaped portions of the second detecting member extend, the second detecting member is provided, at a position between the pair of circular arc-shaped portions of the second detecting member and radially opposite to the cut portion with respect to the rotation axis, with a second detecting member side engaging portion that projects radially outside, the holding member is provided with an engaging projection for the second detecting member, which facilitates positioning of the second detecting member in the circumferential direction and positioning of the holding member relative to the first detecting member in a radial direction by engaging with the second detecting member side engaging portion.

14. A rotation detecting device as claimed in claim 13, wherein:

the second holding member is provided, at a position between the first and second detecting members, with a wall portion that projects toward the first detecting member, the first holding member is provided with a welding portion that is in contact with a surface of the wall portion of the second holding member that faces the first holding member, and which is welded and fixed to the surface in a welding and fixing process, and holding portions that are provided at radially opposed portions of the welding portion to hold the first and second detecting members by contacting the first and second detecting members, the welding portion of the first holding member is shaped to have a smaller diameter portion that is in contact with, and welded and fixed to, a radially inside portion of the wall portion, a larger diameter portion that is in contact with, and welded and fixed to, a radially outside portion of the wall portion, and connecting portions that are shaped to connect the smaller and larger diameter portions and alternately arranged in the circumferential direction.

15. A rotation detecting device as claimed in claim 14, wherein:

the second holding member is formed with recessed cut-off portions at a position opposite to a position where the first detecting member is provided.

16. A rotation detecting device as claimed in claim 13, wherein:

the holding member is provided with detecting member engaging portions that are recessed to open in the direction of the rotation axis and receive therein axial ends of the first and second detecting members with respect to the direction of the rotation axis.

17. A rotation detecting device as claimed in claim 1, wherein:

the first holding member is provided with a welding portion that is in contact with the second holding member and is welded and fixed to the second holding member in a welding and fixing process, and a holding portion that is provided at a radially inside or outside portion of the welding portion to contact with an axial end of the at least one detecting member with respect to the direction of the rotation axis, the holding portion is shaped to have a small axial thickness relative to the welding portion, so that after the welding and fixing process, the holding portion is resiliently deformable.

18. A rotation detecting device as claimed in claim 17, wherein:
    the second holding member is provided with a second holding member side contacting portion that is in contact with the welding portion of the first holding member, and
    a detecting member receiving portion that receives the at least one detecting member,
    the at least one detecting member is arranged relative to the second holding member so as to project toward a side of the first member from the second holding member side contacting portion.

19. A rotation detecting device as claimed in claim 17, wherein:
    the first holding member is resiliently deformable, and is welded and fixed to a given portion of the at least one detecting member such that the welding portion projects toward a side of the second holding member from the holding portion.

20. A power steering device, comprising:
    a steering mechanism that includes an input shaft rotatable with a steering wheel and an output shaft connected to the input shaft through a torsion bar, so that a steering operation of the steering wheel is transmitted to a steered road wheel;
    a housing for rotatably receiving therein the input shaft and the output shaft;
    a magnetic member fixed to the output shaft and having N-poles and S-poles arranged alternately around a rotation axis;
    a detecting member arranged to face the magnetic member and made of a magnetic material;
    a holding member for holding the detecting member, the holding member being fixed to the input shaft and including first and second holding members made of thermoplastic resin, wherein the first and second holding members are welded and fixed to each other, and having the detecting member is disposed between the first and second holding members to prevent contact between the detecting member and the input shaft;
    a magnetic sensor that detects a relative rotation between the input and output shafts by sensing a change of magnetic field in the detecting member which is caused by a relative rotation of the detecting member;
    an electric motor that provides the steering mechanism with a steering assist force; and
    a motor control circuit that determines an instruction signal to the electric motor based on a torque that is produced between the input and output shafts and derived from an output signal of the magnetic sensor.

* * * * *